United States Patent
Chen et al.

(10) Patent No.: US 7,151,933 B2
(45) Date of Patent: *Dec. 19, 2006

(54) METHOD OF HANDOFF WITHIN A TELECOMMUNICATIONS SYSTEM CONTAINING DIGITAL BASE STATIONS WITH DIFFERENT SPECTRAL CAPABILITIES

(75) Inventors: Tao Chen, San Diego, CA (US); Yu-Cheun Jou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 10/969,638

(22) Filed: Oct. 20, 2004

(65) Prior Publication Data

US 2005/0059401 A1   Mar. 17, 2005

Related U.S. Application Data

(63) Continuation of application No. 10/213,601, filed on Aug. 6, 2002, now Pat. No. 6,853,843, which is a continuation of application No. 09/546,219, filed on Apr. 7, 2000, now Pat. No. 6,535,739.

(51) Int. Cl.
*H04Q 7/20* (2006.01)

(52) U.S. Cl. .................. 455/437; 455/552.1; 455/561; 370/331; 370/332; 370/335

(58) Field of Classification Search ................ 455/436, 455/437, 439, 442, 446, 449, 450, 454, 552.1, 455/553.1, 560, 561, 67.11, 522; 370/331, 370/332, 335

See application file for complete search history.

(56) References Cited

U.S. PATENT DOCUMENTS

| | | | | |
|---|---|---|---|---|
| 4,901,307 A | * | 2/1990 | Gilhousen et al. | 370/320 |
| 5,101,501 A | * | 3/1992 | Gilhousen et al. | 455/442 |
| 5,103,459 A | * | 4/1992 | Gilhousen et al. | 370/206 |
| 5,109,390 A | * | 4/1992 | Gilhousen et al. | 370/335 |
| 5,164,958 A | * | 11/1992 | Omura | 375/140 |
| 5,267,261 A | * | 11/1993 | Blakeney et al. | 370/332 |
| 5,490,165 A | * | 2/1996 | Blakeney et al. | 370/335 |
| 5,594,718 A | * | 1/1997 | Weaver et al. | 370/331 |
| 5,625,876 A | * | 4/1997 | Gilhousen et al. | 370/331 |
| 5,640,414 A | * | 6/1997 | Blakeney et al. | 375/130 |
| 5,697,055 A | * | 12/1997 | Gilhousen et al. | 455/436 |
| 5,754,961 A | * | 5/1998 | Serizawa et al. | 455/517 |
| 5,848,063 A | * | 12/1998 | Weaver, Jr. et al. | 370/331 |
| 5,920,549 A | * | 7/1999 | Bruckert et al. | 370/331 |
| 6,035,197 A | * | 3/2000 | Haberman et al. | 455/439 |

(Continued)

*Primary Examiner*—Quochien B. Vuong
(74) *Attorney, Agent, or Firm*—Philip Wadsworth; Thien Nguyen; Rupit Patel

(57) ABSTRACT

The present invention is directed to a digital wireless telecommunications system that includes a plurality of base station of differing spectral capabilities, and a plurality of remote stations capable of transmitting data to and receiving transmissions from the plurality of base stations. The invention herein provides a method for remote station hand-off between base stations of a narrower spectral capacity and base stations of a wider spectral capacity. A method is provided for a wireless telecommunications infrastructure to facilitate a remote station hand-off from a set of narrowband compliant base stations to at least one wideband compliant base station while a remote station is in the coverage area of both types of base stations. Additionally, the invention herein provides remote station apparatus, base station apparatus, and base station controller apparatus for performing the handoff methodology of the present invention.

11 Claims, 22 Drawing Sheets

U.S. PATENT DOCUMENTS 6,055,428 A * 4/2000 Soliman ............... 455/437

6,307,849 B1 * 10/2001 Tiedemann, Jr. ............ 370/335

* cited by examiner

COMMUNICATION PATH OF A MULTI-CARRIER HANDOFF CANDIDATE THAT IS COMMUNICATING WITH TWO SINGLE CARRIER BASE STATIONS

A FIRST HANDOFF EMBODIMENT

METHOD OF HANDOFF WITHIN A TELECOMMUNICATIONS SYSTEM CONTAINING DIGITAL BASE STATIONS WITH DIFFERENT SPECTRAL CAPABILITIES

CLAIM OF PRIORITY UNDER 35 U.S.C. §120

The present Application for Patent is a Continuation of patent application Ser. No. 10/213,601, entitled "METHOD OF HANDOFF WITHIN A TELECOMMUNICATIONS SYSTEM CONTAINING DIGITAL BASE STATIONS WITH DIFFERENT SPECTRAL CAPABILITIES" filed Aug. 6, 2002, now U.S. Pat. No. 6,853,843 which is a Continuation of patent application Ser. No. 09/546,219 filed Apr. 7, 2000 now U.S. Pat. No. 6,535,739, entitled "METHOD OF HANDOFF WITHIN A TELECOMMUNICATIONS SYSTEM CONTAINING DIGITAL BASE STATIONS WITH DIFFERENT SPECTRAL CAPABILITIES" issued Mar. 18, 2003, and assigned to the assignee hereof and hereby expressly incorporated by reference herein.

BACKGROUND

1. Field

The present invention relates to wireless telecommunications. More particularly, the present invention relates to a novel method for facilitating handoffs between digital base stations with different spectral capabilities.

2. Background

In a code division multiple access (CDMA) spread spectrum communication system, a common frequency band is used for communication with all base stations within that system. An example of such a system is described in the TIA/EIA Interim Standard IS-95-A entitled "Mobile Station-Base Station Compatibility Standard for Dual-Mode Wideband Spread Spectrum Cellular System", incorporated herein by reference. The generation and receipt of CDMA signals is disclosed in U.S. Pat. No. 4,901,307 entitled "SPREAD SPECTRUM MULTIPLE ACCESS COMMUNICATION SYSTEMS USING SATELLITE OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM" both of which are assigned to the assignee of the present invention and incorporated herein by reference.

Signals occupying the common frequency band are discriminated at the receiving station through the spread spectrum CDMA waveform properties based on the use of a high rate pseudonoise (PN) code. A PN code is used to modulate signals transmitted from the base stations and the remote stations. Signals from different base stations can be separately received at the receiving station by discrimination of the unique time offset that is introduced in the PN codes assigned to each base station. The high rate PN modulation also allows the receiving station to receive a signal from a single transmission station where the signal has traveled over distinct propagation paths. Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

U.S. Pat. No. 5,101,501 entitled "METHOD AND SYSTEM FOR PROVIDING A SOFT HANDOFF IN A CDMA CELLULAR TELEPHONE SYSTEM," and U.S. Pat. No. 5,267,261 entitled "MOBILE STATION ASSISTED SOFT HANDOFF IN A CDMA CELLULAR COMMUNICATIONS SYSTEM," both of which are assigned to the assignee of the present invention and are incorporated herein by reference, disclose a method and system for simultaneous communication between a remote station and more than one base station, known as soft handoff. Further information concerning handoff is disclosed in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", U.S. Pat. No. 5,640,414, entitled "MOBILE STATION ASSISTED SOFT HANDOFF IN A CDMA CELLULAR COMMUNICATIONS SYSTEM", and U.S. Pat. No. 5,625,876 entitled "METHOD AND APPARATUS FOR PERFORMING HANDOFF BETWEEN SECTORS OF A COMMON BASE STATION," each of which is assigned to the assignee of the present invention and incorporated in its entirety herein by this reference. The subject matter of U.S. Pat. No. 5,625,876 concerns what is known in the art as "softer handoff." For the purposes of this document, the term "soft handoff" is intended to include both "soft handoff" and "softer handoff."

If a remote station travels outside the boundary of the system with which it is currently communicating, it is desirable to maintain the communication link by transferring the call to a neighboring system, if one exists. The neighboring system may use any wireless technology, examples of which are CDMA, NAMPS, AMPS, TDMA or FDMA. If the neighboring system uses CDMA on the same frequency band as the current system, an inter-system soft handoff can be performed. In situations where inter-system soft handoff is not available, the communication link is transferred through a hard handoff where the current connection is broken before a new one is made. Examples of hard handoffs are those from a CDMA system to a system employing an alternate technology or a call transferred between two CDMA systems which use different frequency bands (inter-frequency hard handoff).

Inter-frequency hard handoffs can also occur within a CDMA system. For example, a region of high demand such as a downtown area may require a greater number of frequencies to service demand than the suburban region surrounding it. It may not be cost effective to deploy all available frequencies throughout the system. A call originating on a frequency deployed only in the high congestion area must be handed off as the user travels to a less congested area. Another example is that of a microwave or other service operating on a frequency within the system's boundaries. As users travel into an area suffering from interference from the other service, their call may need to be handed off to a different frequency.

Handoffs can be initiated using a variety of techniques. Handoff techniques, including those using signal quality measurements to initiate handoff, are found in U.S. Pat. No. 5,697,055 entitled "METHOD AND APPARATUS FOR HANDOFF BETWEEN DIFFERENT CELLULAR COMMUNICATIONS SYSTEMS", issued Dec. 9, 1997, assigned to the assignee of the present invention and incorporated herein by reference. Further disclosure on handoffs, including measurement of round-trip signal delay to initiate handoff, is disclosed in U.S. Pat. No. 5,848,063, entitled "METHOD AND APPARATUS FOR HARD HANDOFF IN A CDMA SYSTEM", issued Dec. 8, 1998, assigned to the assignee of the present invention and incorporated herein by reference. Handoffs from CDMA systems to alternate technology systems are disclosed in U.S. Pat. No. 5,594,718 ('306 application) entitled "METHOD AND APPARATUS FOR MOBILE UNIT ASSISTED CDMA TO ALTERNATIVE SYSTEM HARD HANDOFF", issued Jan. 14, 1997, assigned to the assignee of the present invention and incorporated herein by reference. In the '306 application, pilot beacons are placed at the boundaries of the system. When a remote station reports these pilots to the base station, the base station knows that the remote station is approaching the boundary.

When a system has determined that a call should be transferred to another system via hard handoff, a message is sent to the remote station directing it to do so along with parameters that enable the remote station to connect with the destination system. The system has only estimates of the remote station's actual location and environment, so the parameters sent to the remote station are not guaranteed to be accurate. For example, with beacon aided handoff, the measurement of the pilot beacon's signal strength can be a valid criterion for triggering the handoff. However, the appropriate cell or cells in the destination system which are to be assigned to the remote station (known as the Active Set) are not necessarily known.

The cdma2000 cellular telephone standard proposal issued by the Telecommunications Industry Association (TIA), entitled "cdma2000 Series TIA/EIA/IS-2000," published in August of 1999, hereinafter referred to as cdma2000, uses advanced signal processing techniques to provide efficient and high quality phone service, and is incorporated herein by reference. For example, a cdma2000 compliant cellular telephone system utilizes decoding, error detection, forward error correction (FEC), interleaving, and spread spectrum modulation in order to make more efficient use of the available radio frequency (RF) bandwidth, and to provide robust connections. In general, the benefits provided by cdma2000 include longer talk time and fewer dropped calls when compared to other types of cellular telephone systems.

In the world of cellular telecommunications, those skilled in the art often use the terms 1G, 2G, and 3G. The terms refer to the generation of the cellular technology used. 1G refers to the first generation, 2G to the second generation, and 3G to the third generation. 1G is used to refer to the analog phone system, known as an AMPS (Advanced Mobile Phone Service) phone systems.

2G is commonly used to refer to the digital cellular systems that are prevalent throughout the world, and include cdmaOne, Global System for Mobile communications (GSM), and Time Division Multiple Access (TDMA). cdmaOne, based on a Code Division Multiple Access (CDMA) technology, refers to a digital cellular system that adheres to the family of IS-95 standards. 2G systems can support a greater number of users in a dense area than can 1G systems.

3G is commonly used to refer to the digital cellular systems currently being developed. 3G systems include cdma2000 and Wideband-CDMA (W-CDMA). 3G systems promise higher peak data transfer rates than do their 2G counterparts. Additionally, many 3G systems can support a greater number of users than can 2G systems.

Spreading Rate 3 versions of cdma2000, hereinafter referred to as 3X, use a frequency band of 3.75 megahertz (MHz), comprised of three 1.25 MHz chunks, while the Spreading Rate 1 versions of cmda2000, hereinafter referred to as 1X, uses a frequency band having a width of 1.25 MHz. Wherein 1X is a single carrier protocol, 3X is a multi-carrier protocol. As would be known to one skilled in the art, a single carrier protocol transmits data in a single frequency band, while a multi-carrier protocol, transmits data in multiple [single carrier] frequency bands. For instance, whereas 1X transmits data in a single 1.25 MHz frequency bands, 3X transmits data in three 1.25 MHz frequency bands. The modulation techniques performed by multi-carrier systems, hereinafter referred to as a multi-carrier modulation techniques, differ from those performed by single carrier systems, hereinafter referred to as single carrier modulation techniques. Although the examples of 1X and 3X are used as single carrier and multi-carrier protocols respectively, the invention is not limited to 1X and 3X protocols, and applies equally well to any system that is comprised of both single carrier and multi-carrier base stations, such as may be the case in future versions of W-CDMA that are attempting to support higher data transmission rates.

Any given cdma2000 system need not support 1X (version 1X of cdma2000) exclusively or 3X (version 3X of cdma2000) exclusively. A version of cdma2000 that uses a multi-carrier 3.75 MHz spectrum on the forward link, the wireless link that delivers data from the base station to the remote station, but uses a single carrier 1.25 MHz spectrum on the reverse link, the wireless link that delivers data from the remote station to the base station is described in U.S. patent application Ser. No. 09/382,438 entitled "Method and Apparatus Using a Multi-Carrier Forward Link in a Wireless Communication System" assigned to the assignee of the present invention and incorporated herein by reference. A system such as this, that uses multi-carrier capabilities on the forward link, but uses single carrier capabilities on the reverse link, is hereinafter referred to as a hybrid system. A 3X/1X system is merely used as an example, and a hybrid system is not limited to such an embodiment. A block diagram of an exemplary hybrid system is shown in FIG. 1.

FIG. 1 is a block diagram of an exemplary simplified cellular telephone system that uses multi-carrier transmission on the forward link and single carrier transmissions on the reverse link, wherein a 3X protocol is used on the forward link and a 1X protocol is used on the reverse link. Remote stations such as remote stations 110 (typically cellular telephones, personal digital assistants (PDAs) with wireless capabilities, or laptop computers with wireless capabilities) are located among base stations 120. The remote stations 110a and 110b are in an active mode and are therefore interfacing with at least one base station 120 using radio frequency (RF) signals modulated in accordance with the CDMA signal processing techniques. A system and method for modulating RF signals in accordance with CDMA modulation is described in U.S. Pat. No. 5,103,459 entitled "System and Method for Generating Signal Waveforms in a CDMA Cellular Telephone System" assigned to the assignee of the present invention and previously incorporated herein by reference. The other remote stations 110 are in standby mode and are therefore monitoring either a full paging channel for page messages indicating a request to communicate, or they are monitoring a quick paging channel for indicator bits indicating whether a message is expected on a full paging channel.

Each given base station 120 that is in active mode with at least one remote station 110 transmits data to remote stations 110 across three frequency bands f1, f2, f3, and receives data from remote stations 110 in a single frequency band f4. Each frequency band f1, f2, f3, and f4 has the same bandwidth. Frequency bands f1, f2, and f3 are adjacent frequency bands. For instance, if in the example of the hybrid system each band f1 was the frequency band 1900 MHz–1901.25 MHz, then f2 would be 1901.25 MHz–1902.5 MHz, and f3 would be 1902.5 MHz–1903.75 MHz. Thus, the adjacent frequency bands take up the spectrum 1900 MHz–1903.75 MHz in this example. In such a case, f4 would be a 1.25 MHz band located outside of that frequency range. For example, f4 could be located at 1820 MHz–1821.25 MHz.

Base stations 120 connect to a Base Station Controller (BSC) 114. Base Station Controller 114 controls base stations 120, and exchanges information packets between Mobile Switching Center (MSC) 116 and base stations 120. Mobile Switching Center 116 exchanges information packets between Public Switched Telephone Network 118. In other embodiments, different switches, such as a packet data serving node (PDSN), can be connected to the system. A cellular telephone system can contain more than one Base Station Controller 114 and more than one Mobile Switching Center 116, or conversely, in decentralized systems, such as those disclosed in U.S. Pat. No. 6,215,779, entitled "DISTRIBUTED INFRASTRUCTURE FOR WIRELESS DATA COMMUNICATIONS", issued Apr. 10, 2001, assigned to the assignee of the present invention, and incorporated by reference herein, Base Station Controller 114 or Mobile Switching Center 116 may be absent from the cellular telephone system.

FIG. 2 is a block diagram of an exemplary simplified cellular telephone system that uses single carrier transmissions on the forward link and single carrier transmissions on the reverse link. Remote stations such as remote stations 210 (typically cellular telephones) are located among base stations 220. The remote stations 210a and 210b are in an active mode and are therefore interfacing with at least one base station 220 using radio frequency (RF) signals modulated in accordance with the CDMA signal processing techniques. The other remote stations 210 are in standby mode and are therefore monitoring either a full paging channel for page messages indicating a request to communicate, or they are monitoring a quick paging channel for indicator bits indicating whether a message is expected on a full paging channel.

Each given base station 220 that is in active mode with at least one remote station 210, transmits data to remote stations 210 across a single frequency band f1, and receives data from remote stations 210 in a single frequency band f2. Each frequency band f1 and f2 has the same bandwidth. Frequency bands f1 and f2 can be offset by a predefined amount. If an amount of 80 MHz is used, and f1 is at the frequency band 1900 MHz–1901.25 MHz, then f2 could be located at 1820.00 MHz–1821.80 25 MHz.

Base stations 220 connect to a Base Station Controller 114. Base Station Controller 114 controls base stations 220, and exchanges information packets between Mobile Switching Center 116 and base stations 220. Mobile Switching Center 116 exchanges information packets between Public Switched Telephone Network 118. In other embodiments, different switches, such as a packet data serving node (PDSN), can be connected to the system. A cellular telephone system can contain more than one Base Station Controller 114 and more than one Mobile Switching Center 116, or conversely, in decentralized systems, such as those disclosed in U.S. Pat. No. 6,215,779 entitled "DISTRIBUTED INFRASTRUCTURE FOR WIRELESS DATA COMMUNICATIONS", issued Apr. 10, 2001, applied for by the applicant of the present invention, and incorporated by reference herein, Base Station Controller 114 or Mobile Switching Center 116 may be absent from the cellular telephone system as separate entities, but rather may be integrated into the base stations themselves.

FIG. 3 is a block diagram of an exemplary simplified cellular telephone system that uses multi-carrier transmissions on the forward link and multi-carrier transmissions on the reverse link. Remote stations such as remote stations 310 (typically cellular telephones) are located among base stations 320. The remote stations 310a and 310b are in an active mode and are therefore interfacing with at least one base station 320 using radio frequency (RF) signals modulated in accordance with the CDMA signal processing techniques. The other remote stations 310 are in standby mode and are therefore monitoring either a full paging channel for page messages indicating a request to communicate, or they are monitoring a quick paging channel for indicator bits indicating whether a message is expected on a full paging channel.

Each given base station 320 that is in active mode with at least one remote station 310, transmits data to remote stations 310 across three frequency bands, f1, f2, f3, and receives data from remote stations 310 across three frequency bands f4, f5, f6. Each frequency band f1, f2, f3, f4, f5, f6 has the same bandwidth. Frequency bands f1, f2, and f3 are adjacent frequency bands. For instance, if in the example of the hybrid system each band f1 was the frequency band 1900 MHz–1901.25 MHz, then f2 would be 1901.25 MHz–1902.5 MHz, and f3 would be 1902.5 MHz–1903.75 MHz. Thus the adjacent frequency bands take up the spectrum 1900 MHz–1903.75 MHz in this example. Likewise, frequency bands f4, f5, and f6 are adjacent to one another. Frequency bands f1 and f4 can be offset by a predefined amount. If an amount of 80 MHz is used, and f1 begins at the frequency 1900 MHz, then reverse link bands f4, f5, f6, could take up the 3.75 MHz spectrum located between 1820 MHz–1823.75 MHz.

Although a carrier could upgrade its entire network from a single carrier system to a multi-carrier system all at once, this is often undesirable in light of costs. Economically, it may be more desirable for a carrier to put multi-carrier capabilities in a few areas of their network that will benefit the most from multi-carrier capabilities, and then slowly roll out multi-carrier capabilities into other areas of its network over time. During such a gradual rollout, some of the base stations in the system will be multi-carrier protocol compliant while others will not. Likewise, some carriers may find it desirable to upgrade a portion of its network to support a multi-carrier protocol, without having the intent of ever upgrading the remaining portion of its network to a multi-carrier protocol.

What is needed is a method and apparatus for performing handoff in a wireless telecommunication system that contains digital base stations, some of which comply with a multi-carrier protocol and some of which are not multi-carrier compliant.

SUMMARY

The present invention is directed to a digital wireless telecommunications system that includes a plurality of base stations of differing spectral capabilities, and a plurality of remote stations capable of transmitting data to and receiving transmissions from the plurality of base stations. The invention herein provides a method for remote station handoff between base stations of a narrower spectral capacity and base stations of a wider spectral capacity. A method is provided for a wireless telecommunications infrastructure to facilitate a remote station hand-off from a set of single carrier compliant base stations to at least one multi-carrier compliant base station while a remote station is in the coverage area of both types of base stations.

In one embodiment the handoff is enabled by transmitting a message to a remote station that indicates that the remote station should transmit modulated signals according to a single carrier protocol (e.g., 1X) and should receive modulated signals according to a multi-carrier protocol. In another embodiment, the remote station is instructed to transmit the modulated signals in the same frequency band as was used for transmission prior to the handoff. In another embodiment, the remote station is instructed to transmit the modulated signals in a different frequency band than was used for transmission prior to the handoff. In another embodiment the single carrier compliant base stations transmit in the single carrier frequency a portion of the signal that is generated in accordance with the multi-carrier protocol.

In another embodiment, the handoff is enabled by transmitting a message to a remote station that indicates that the remote station should transmit modulated signals according to a multi-carrier protocol and should receive modulated signals according to a multi-carrier protocol.

In another embodiment, the handoff is enabled by transmitting a message to a remote station that indicates that the remote station should transmit modulated signals according to a single carrier protocol and should receive modulated signals according to a single carrier protocol. In this embodiment, the remote station is instructed that it should receive single carrier modulated signals from at least one multi-carrier compliant base station.

In many of the embodiments, a means to avoid reverse link interference is achieved by performing a two part handoff, the first of which is performed while the remote station is in the coverage of both types of base stations, and the second of which occurs when the remote station travels to an area that is only in the coverage of multi-carrier compliant base stations.

The remote station adjusts its transmit and receive modulation techniques in accordance with the received handoff messages of the above embodiments.

The invention herein also provides remote station apparatus, base station apparatus, and base station controller apparatus for performing the above-described methodology.

BRIEF DESCRIPTION OF THE DRAWINGS

The features, objects, and advantages of the present invention will become more apparent from the detailed description set forth below when taken in conjunction with the drawings in which like reference characters identify like features correspondingly throughout.

DETAILED DESCRIPTION

Although many of the detailed descriptions are discussed in reference to a cdma2000 system containing 1X and 3X base stations, one skilled in the art will appreciate that the invention can be applied to any spread spectrum system and is not limited to the 1X and 3X systems used in many of the exemplary embodiments.

When discussing signal transmissions in a frequency range, the phrase 'in a frequency band' is used herein to refer to a spread spectrum signal that is spread across a given frequency. For instance, when stating that a signal is transmitted in frequency band X, wherein frequency band X is defined as the band ranging from 1900 MHz–1903.75 MHz, it is meant that the transmitted signal is spread across the frequency band 1900 MHz–1903.75 MHz.

Figure 4:
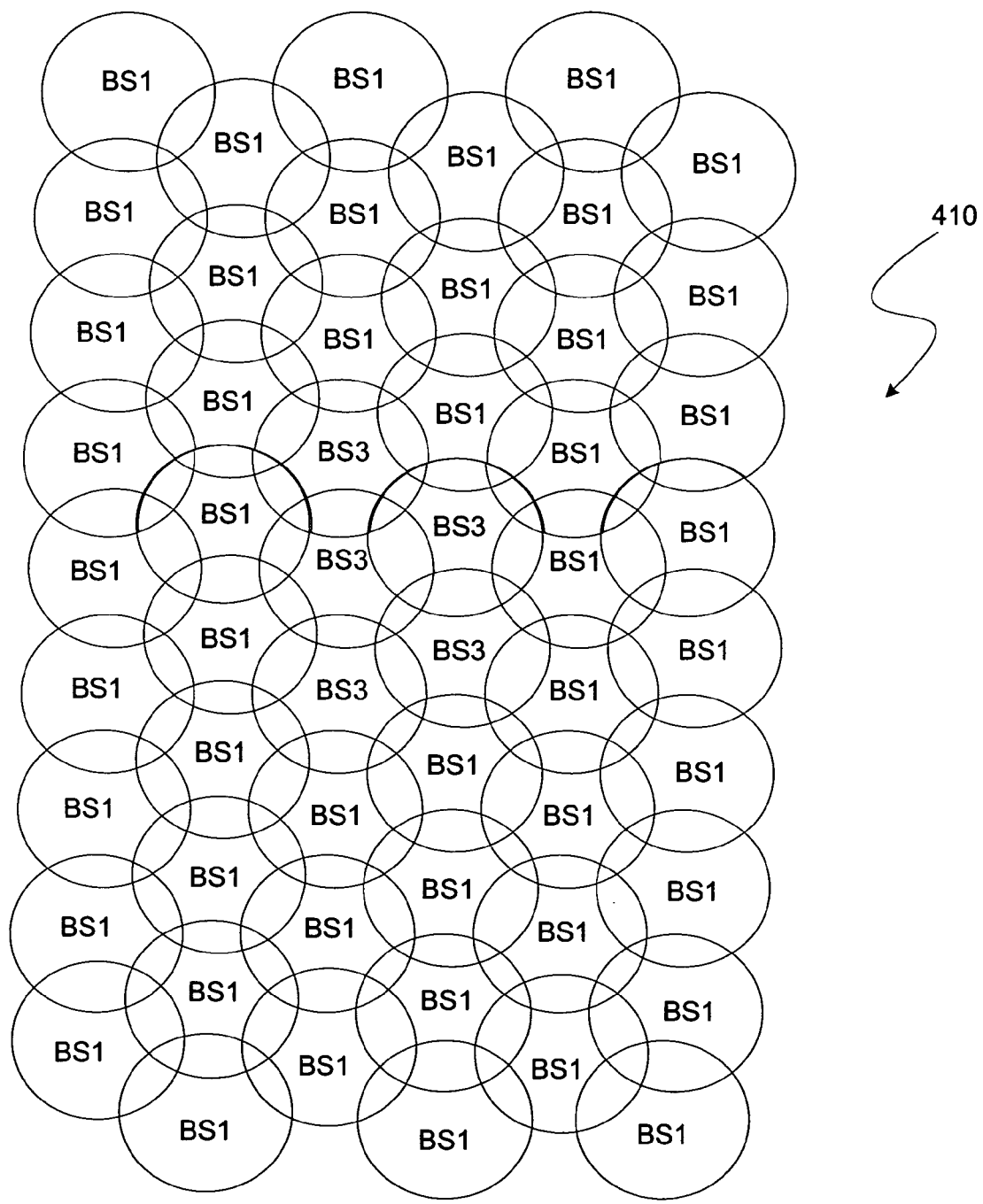
FIG. 4 is a simplified network diagram of an exemplary embodiment of the coverage of a spread spectrum system in the midst of a hybrid deployment of single carrier services to multi-carrier services.

FIG. 4 is a simplified network diagram of an exemplary embodiment of the coverage of a spread spectrum system in the midst of a hybrid deployment of single carrier services to multi-carrier services.

In the network diagram, each circular footprint labeled BS3 represents a base station that is multi-carrier compliant and its corresponding coverage/footprint. Each circle, itself, is representative of the footprint of a base station BS3. Although the physical base station, BS3, is not diagrammed separately within the figure, it can be assumed that it lays somewhere within the diagrammed footprint. Each multi-carrier compliant base station is capable of both transmitting and receiving spread spectrum signals in accordance with a multi-carrier protocol. Hereinafter, all multi-carrier compliant base stations will simply be referred to as multi-carrier base stations.

In the network diagram, each circular footprint labeled BS1 represents a base station that is single carrier compliant and its corresponding coverage/footprint. Each circle, itself, is representative of the footprint of a base station BS1. Although the physical base station, BS1, is not diagrammed separately within the figure, it can be assumed that it lays somewhere within the diagrammed footprint. Each single carrier compliant base station is capable of both transmitting and receiving spread spectrum signals in accordance with a single carrier protocol (e.g., 1X). Hereinafter, all single carrier compliant base stations will simply be referred to as single carrier base stations.

A carrier (e.g. Vodafone AirTouch) will likely deploy multi-carrier services in small areas, or pockets, wherein multi-carrier services are first needed. FIG. 4 illustrates an example of such a network 410, wherein a small pocket of multi-carrier services is provided by six multi-carrier base stations, BS3, and wherein single carrier services are provided in a large surrounding area by forty-eight single carrier base stations, BS1. Hereinafter, the term non-homogenous network will be used to refer to a network containing both multi-carrier base stations and single carrier base stations, such as network 410. The non-homogenous network is essentially the combination of a single carrier system (the base stations labeled BS1) and a multi-carrier system (the base stations labeled BS3) that share common infrastructure, such as a BSC or MSC.

Multi-carrier base stations BS3 are not necessarily limited to communicating with remote stations by transmitting data to a remote station in compliance with a multi-carrier protocol in a multi-carrier frequency band. Rather, though, multi-carrier base stations BS3 may also be able to communicate with remote stations in accordance with a single carrier protocol in a single carrier frequency.

Having such flexibility in multi-carrier base stations proves useful when a network 410 is created by upgrading a pocket of single carrier base stations to multi-carrier base stations. In such a network 410, many pre-existing remote stations that desire service on the network 410 may only be single carrier compliant. So as not to deny service to non-multi-carrier compliant remote stations that have traveled into these upgraded pockets, the upgraded base stations may continue to provide single carrier compliant services in addition to the newly added multi-carrier services.

Although a multi-carrier base station, as used herein, can mean a base station that is not only multi-carrier compliant, but one that additionally is single carrier compliant, the same does not hold true for the meaning of a single carrier base station. A single carrier base station, as used herein, is a base station that is single carrier compliant and is not fully multi-carrier compliant. Thus, single carrier base stations cannot both transmit data on a multi-carrier forward link in accordance with a multi-carrier protocol and receive data on a multi-carrier reverse link in accordance with a multi-carrier protocol. All base stations that can both transmit data on a multi-carrier forward link in accordance with a multi-carrier protocol and receive data on a multi-carrier reverse link in accordance with a multi-carrier protocol are referred to herein as multi-carrier base stations.

Figure 5:
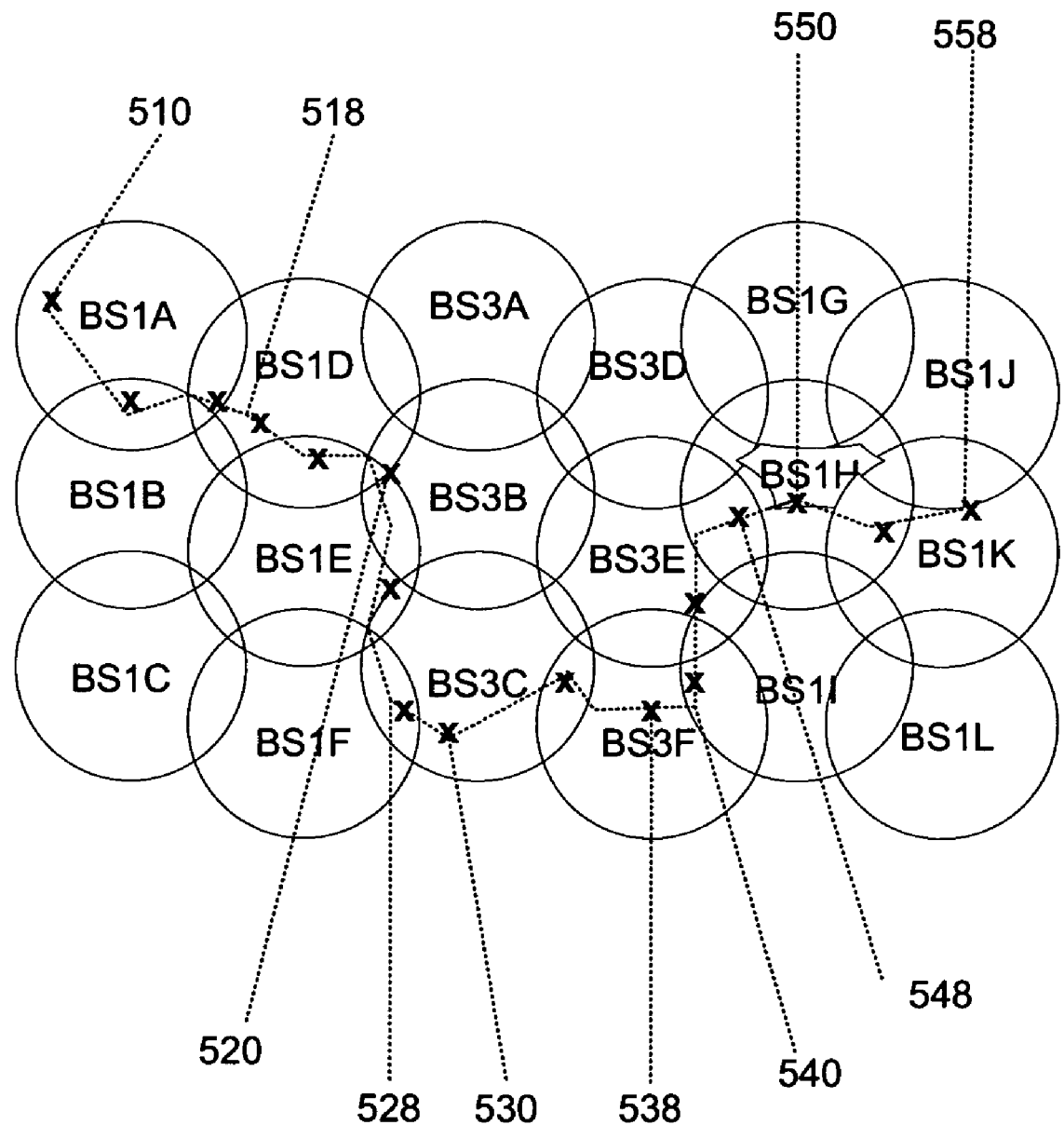
FIG. 5 diagrams a portion of the simplified network diagram of FIG. 4, and also shows the path of an exemplary remote station traveling throughout the network.

FIG. 5 diagrams a portion of the network 410, and also shows the path of an exemplary remote station traveling throughout the network. Subscripts have been added to each instance of BS1 and BS3 for distinguishment purposes.

In FIG. 5, a remote station is in a call while traveling throughout a portion of network 410. The remote station begins its call at point 510 and terminates its call at point 558. "X"es are placed in the diagram to call to the attention of the reader various points at which the remote station is in different coverage areas.

At points 510 through 518, the remote station is solely in the coverage areas of single carrier base stations. At point 510, the remote station is only in the coverage area of BS1a. At point 518, the remote station is in the coverage area of both BS1d and BS1e. Because the remote station never enters multi-carrier coverage between these points, no handoff is needed between the multi-carrier base stations and the single carrier base stations.

At points 530 through 538, the remote station is solely in the coverage area of multi-carrier base stations. At point 530, the remote station is only in the coverage area of BS3c. At point 538, the remote station is in the coverage area of BS3f. Because the remote station never enters single carrier coverage between these points, no handoff is needed between the multi-carrier base stations and the single carrier base stations between these points.

At points 550 through 558, the remote station is solely in the coverage areas of single carrier base stations. At point 550, the remote station is only in the coverage area of BS1h. At point 558, the remote station is in the coverage area of BS1k. Because the remote station never enters multi-carrier coverage between these points, no handoff is needed between the multi-carrier base stations and the single carrier base stations, between these points.

At points 520 through 528, the remote station is within the coverage areas of both single carrier base stations and multi-carrier base stations. At point 520, the remote station is in the coverage area of single carrier base stations BS1d and BS1e, and it is also in the coverage area of multi-carrier base station BS3b. At point 528, the remote station is in the coverage area of single carrier base station BS1f, and it is also in the coverage area of multi-carrier base station BS3c.

At points 540 through 548, the remote station is within the coverage areas of both single carrier base stations and multi-carrier base stations. At point 540, the remote station is in the coverage area of single carrier base stations BS1i, and it is also in the coverage area of multi-carrier base station BS3f. At point 548, the remote station is in the coverage area of single carrier base stations BS1h and BS1i, and it is also in the coverage area of multi-carrier base station BS3e.

In order to keep the call up, at some point between point 518 and point 530 a handoff must occur between single carrier base stations BS1 and multi-carrier base stations BS3. Likewise, at some point between point 538 and point 550 a handoff must occur between multi-carrier base stations BS3 and single carrier base stations BS1.

Figure 7:
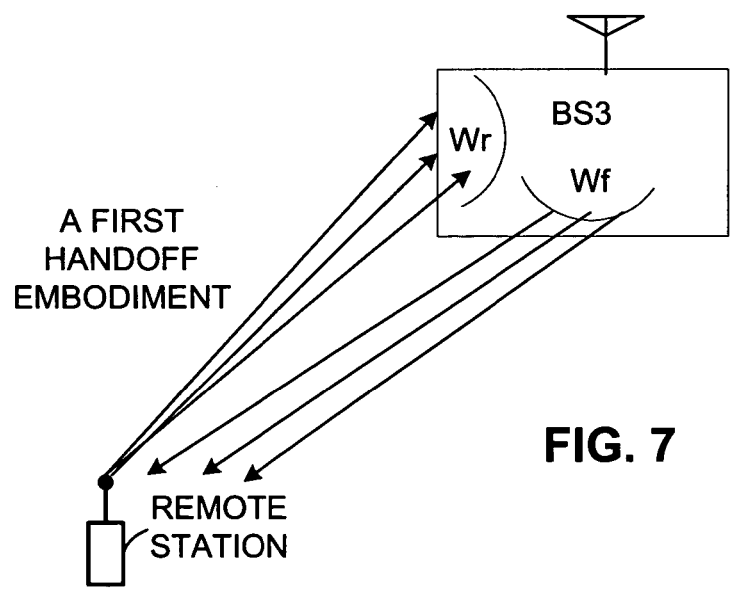
FIG. 7 is a diagram of an exemplary communication path during the handoff of a first handoff embodiment.

Several embodiments of the invention facilitate such a handoff. Some notation will prove helpful in describing these embodiments. Nf will be used hereinafter to represent a particular single carrier frequency band (such as 1900 MHz–1901.25 MHz) used for the forward link, while Nr will be used hereinafter to represent a particular single carrier frequency used for the reverse link. The term multi-carrier frequency band is hereinafter used to refer to the set of single-carrier frequency bands used for a multi-carrier transmission. For instance, if the combination of transmissions on frequency bands 1900–1901.25 MHz, 1901.25–1902.50 MHz, and 1902.50–1903.75 MHz is used to send a multi-carrier signal (e.g. a 3X transmission signal), then the set of these single-carrier frequency bands comprises a multi-carrier frequency band. Wf will be used hereinafter to represent a particular multi-carrier frequency band used for the forward link, while Wr will be used hereinafter to represent a particular multi-carrier frequency band used for the reverse link. Nf can be contained within Wf, or it can be a frequency band outside of Wf, further discussed in reference to FIG. 7. Likewise, Nr can be contained within Wr, or it can be a frequency band outside of Wr.

A remote station that is communicating with at least one base station BS1 via a single carrier protocol on frequencies Nf and Nr, while it is also in the coverage area of at least one multi-carrier base station BS3, is hereinafter referred to as a multi-carrier handoff candidate. Referring to FIG. 5, if the remote station is only communicating with BS1d and BS1e at point 520, it would be considered a multi-carrier handoff candidate at that point, since it is also in the coverage area of a multi-carrier base station BS3b. It should be noted that point 520 is not the only spot at which the remote station could be considered a multi-carrier handoff candidate. At all points 520–528, if the remote station is communicating with at least one single carrier base station BS1, but it is not communicating with any multi-carrier base stations BS3, the remote station would be considered a multi-carrier handoff candidate.

Multiple embodiments of the invention, each for facilitating a handoff in a non-homogenous system, are described below. Following the description of these embodiments is a description of a flow chart that can be used for all handoff embodiments.

In a first handoff embodiment of the present invention, a multi-carrier handoff candidate is sent a handoff message (often referred to as an extended handoff direction message) from at least one single carrier base station BS1, instructing it to cease single carrier communications with single carrier base stations BS1 on Nf and Nr, and to begin multi-carrier communications on frequencies Wf and Wr with multi-carrier base stations BS3. For instance, at point 520, the remote station, which was communicating with BS1d and BS1e on frequencies Nf and Nr using a single carrier protocol, would be instructed to switch its mode of communication to a multi-carrier protocol on frequencies Wf and Wr, and to only communicate with base station BS3b. In such an embodiment, the infrastructure instructs the multi-carrier base stations BS3 to begin communications with the remote station using the multi-carrier protocol on frequencies Wf and Wr. The infrastructure also instructs the single carrier base stations BS1 to cease communications with the remote station. Using point 520 as an exemplary point of handoff, figures used herein will assume a multi-carrier handoff candidate that is in the coverage area of two single carrier base stations BS1 and one multi-carrier base station BS3. However, one skilled in the art will realize that a multi-carrier handoff candidate could be in a coverage area in which there are more or less of either type of base station, as long as it is in the coverage area of at least one single carrier base station and one multi-carrier base station. One skilled in the art will also appreciate that the descriptions of the below embodiments are not limited to coverage areas of exactly two single carrier base stations BS1 and one multi-carrier base station BS3, but that they apply to other coverage mixes as well, such as a point that is in the coverage area of two multi-carrier base stations BS3 and only one single carrier base station BS1.

Figure 6:
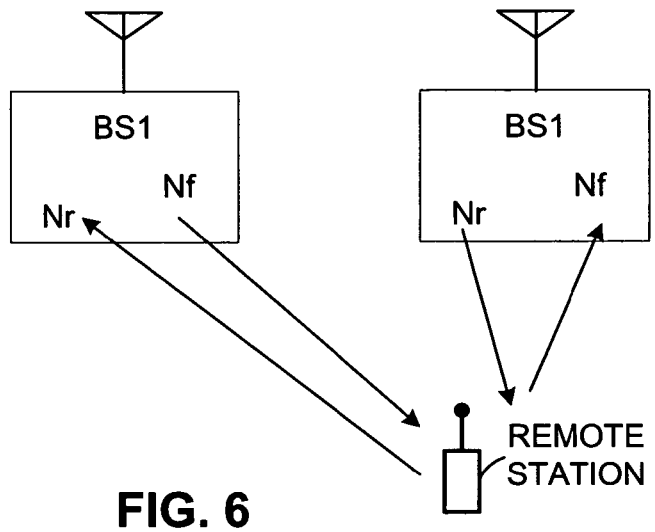
FIG. 6 is an exemplary diagram of the communication path of a remote station that is a multi-carrier handoff candidate communicating with two single carrier base stations BS1.

An exemplary diagram of the communication path of a remote station that is a multi-carrier handoff candidate communicating with two single carrier base stations BS1 is shown in FIG. 6. A diagram of an exemplary communication path after the handoff of a first handoff embodiment appears in FIG. 7, wherein the remote station begins transmitting in frequency band Wr, and begins receiving in frequency band Wf, and wherein transmissions adhering to the multi-carrier protocol are received by a base station BS3, and wherein the base station BS3 begins transmitting in accordance with the multi-carrier protocol in frequency band Wf.

Although this first handoff embodiment succeeds in allowing a remote station to keep up a communications link while traveling throughout a non-homogenous network, it lacks the desirable features of communication path diversity and power control that can be provided by soft handoff.

The lack of being in communication with both single carrier base stations and multi-carrier base stations when in the coverage of both negatively affects path diversity. If the remote station performs a handoff of the first handoff embodiment just prior to point 520, then the remote station will only have communication links established with multi-carrier base station BS3b. Although the remote station is in the coverage areas of both BS1d and BS1e, it will no longer have communication links with these base stations, and will not gain the path diversity that could have been received by being in a soft handoff with these base stations. This is especially evident in instances where Nf is contained within Wf, and where BS1d or BS1e is transmitting at a particularly high power level and is interfering with the signals transmitted from BS3b. If the remote station had been in soft handoff with BS3b, BS1d, and BS1e, it would likely have received a good transmission from the high powered base station, either BS1*d* or BS1*e*, whose high transmission power level significantly corrupted the transmission signal transmitted by BS3*b*. However, in the case that it is not in such a soft handoff, as is the case in the first handoff embodiment, it would only receive the corrupted signal from BS3*b*.

The lack of such a soft handoff negatively affects reverse link power control as well. For instance, if after a handoff of the first handoff embodiment, at point 520 BS3*b* instructs the remote station to raise its transmission power, the remote station will do so without regard as whether its transmissions are interfering with base station BS1*d* or BS1*e*, as can occur when Nr is contained within Wr. This is the case because the remote station is only receiving power control information from BS3*b*. However, had the remote station been in soft handoff with all three base stations, it would only raise its transmission power if all three base stations had requested it to do so, thus reducing the chance that the remote station would raise its power level excessively.

Although the above embodiment describes how to facilitate a handoff from a single carrier base station to a multi-carrier base station, one skilled in the art will appreciate that a similar method can be used to handoff from a multi-carrier base station to a single carrier base station. A handoff from a multi-carrier base station to a single carrier base station could be used when a remote station is exiting multi-carrier coverage, such as at point 540 or point 548.

Figure 8:
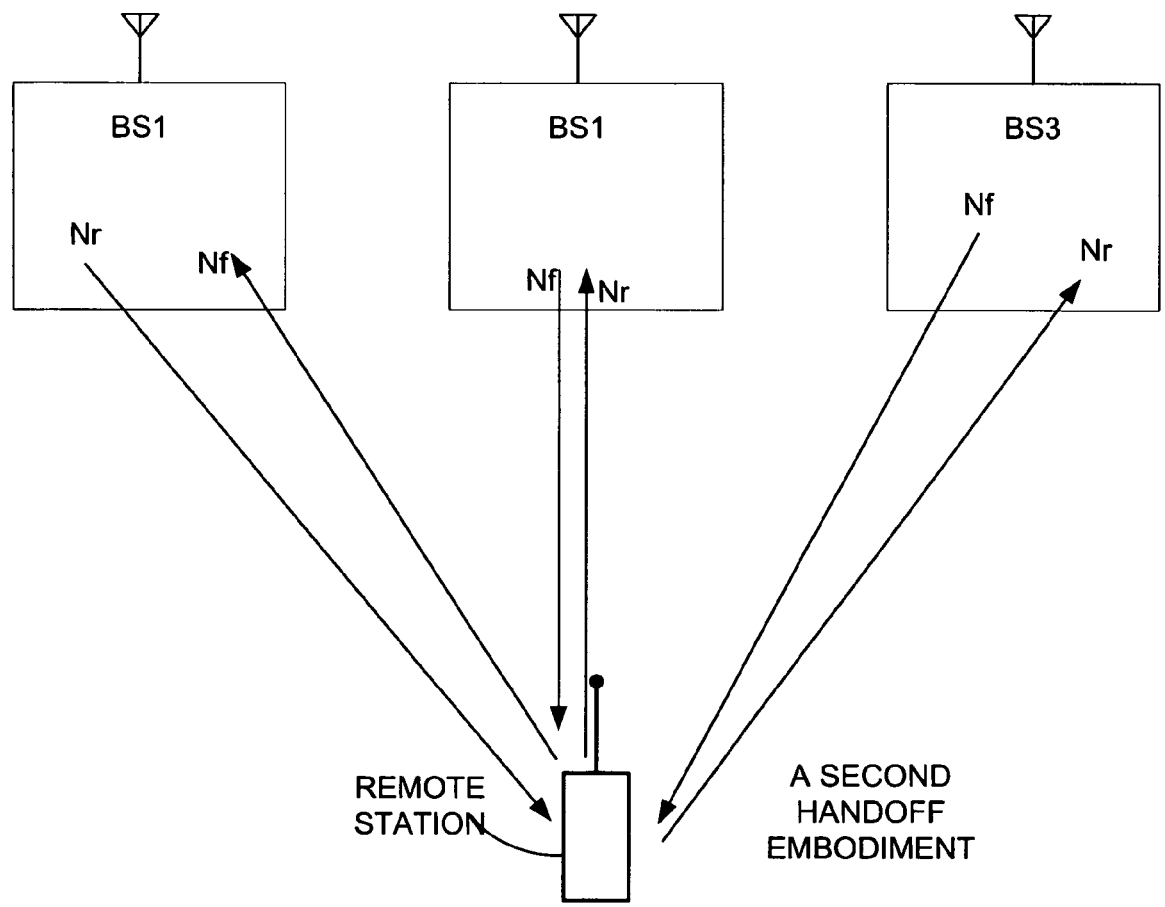
FIG. 8 is a diagram of an exemplary communication path during the handoff of a second handoff embodiment.

In FIG. 8, in a second embodiment of the present invention, a multi-carrier handoff candidate is sent a soft handoff message that instructs the remote station to continue receiving single carrier signals from the single carrier base stations BS1, but also to additionally begin receiving single carrier communications on frequency Nf from at least one multi-carrier base station BS3. In this embodiment, the infrastructure instructs these multi-carrier base stations BS3 to begin communications with the remote station using the single carrier protocol both on the forward and reverse links in frequency bands Nf and Nr, respectively. For instance, if the soft handoff were to occur at point 520, BS3*b* would be instructed to begin single carrier communications with the multi-carrier handoff candidate in frequency bands Nf and Nr.

While a remote station is in such a soft handoff, it has communication links both with single carrier base stations BS1 and with multi-carrier base stations BS3, and thus receives the communication path diversity and power control benefits provided by such a soft handoff. Namely, the remote station is receiving data from and transmitting data to multiple base stations along different paths. Additionally, the remote station is receiving power control feedback (commonly received in the form of power control bits) from both the single carrier and multi-carrier base stations whose coverage area it is in, and thus is less likely to raise its power transmission level to a point at which it unnecessarily interferes with one of these base stations. A diagram of the communication path after a handoff of this embodiment appears in FIG. 8, wherein the remote station continues transmitting in frequency band Nr, and wherein the remote station continues receiving single carrier transmissions in frequency band Nf from single carrier base stations BS1. FIG. 8 also illustrates that the remote station begins receiving single carrier transmissions in frequency Nf from a multi-carrier base station BS3. Additionally, remote station transmissions adhering to the single carrier protocol are received by single carrier base stations BS1 and multi-carrier base station BS3.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the second handoff embodiment, once the remote station travels to a point at which it is no longer in the coverage of single carrier basestations BS1, such as point 530, the remote station will only be communicating with multi-carrier base stations BS3, but will be communicating with them using the single carrier protocol. At such a point, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr.

For instance, at point 530, a remote station which had performed a handoff of the second handoff embodiment, and which was communicating with BS3*c* in frequency bands Nf and Nr, using a single carrier protocol, would be instructed to switch its mode of communication with BS3*c* to a multi-carrier protocol in frequency bands Wf and Wr. After this subsequent handoff, a diagram of the communication path looks once again as it did in FIG. 7.

Performing such a subsequent handoff is beneficial because it allows the benefits of multi-carrier transmissions to be achieved. Wherein performing multi-carrier transmissions on both the forward and reverse links at a time when a remote station was in the coverage area of both multi-carrier and single carrier base stations, as was done in the first handoff embodiment, could have deleterious effects, performing these transmissions when not in a single carrier coverage area will not have these deleterious effects, and thus should be performed after a remote station exits the single carrier base stations' BS1 coverage areas.

A subsequent handoff that tells the remote station to only communicate with one type of base station in that base station's native protocol (the native protocol of a multi-carrier base station is a multi-carrier protocol, while the native protocol of a single carrier base station is a single carrier protocol) is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

The advantage of the second handoff embodiment of the present invention over the first is that the use of soft handoff when in the coverage area of both single carrier and multi-carrier base stations provides the benefits of path diversity and decreases the chance of the remote station interfering with one of the cells due to the fact that the remote station is receiving power control feedback from both types (single carrier and multi-carrier) of base stations. Although this second handoff embodiment provides these improvements over the first, there are considerations that still need to be taken into account in regards to the second handoff embodiment.

One such consideration is how the power levels of the multi-carrier base stations could be affected. Such consideration needs to be taken into account because the transmission power needed to generate the spectral density used within a certain frequency bandwidth X to transmit N information bits via a single carrier protocol is generally much greater than the transmission power needed to generate the spectral density used in the same bandwidth X to transmit N information bits via a multi-carrier protocol. This consideration is best considered after viewing FIGS. 9(a & b) and FIGS. 10(a & b).

Figure 9A:
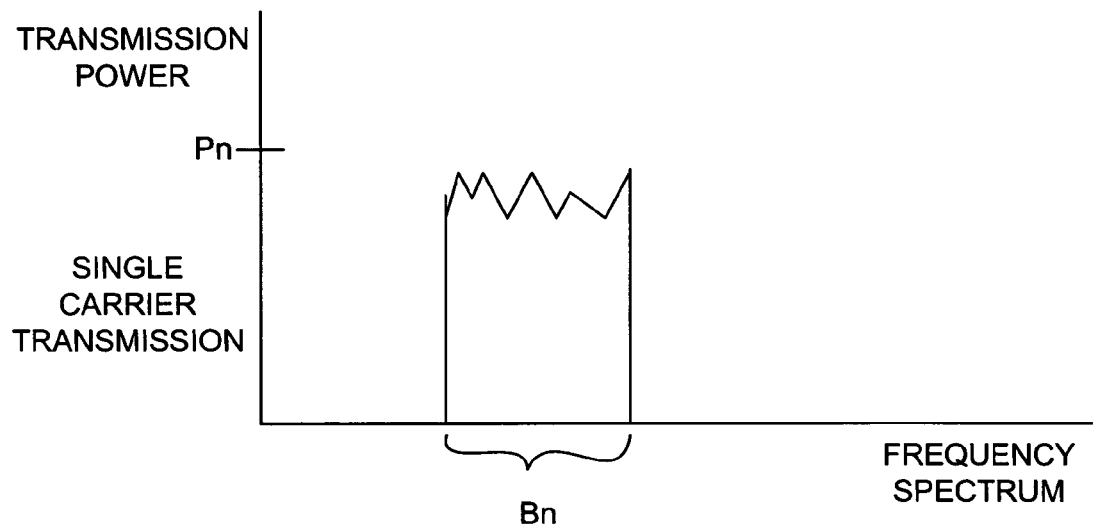
FIGS. 9a and 9b contain an illustration of the spectral density and the associated transmission power that would be utilized to transmit N information bits using an exemplary single carrier protocol.
Figure 9B:
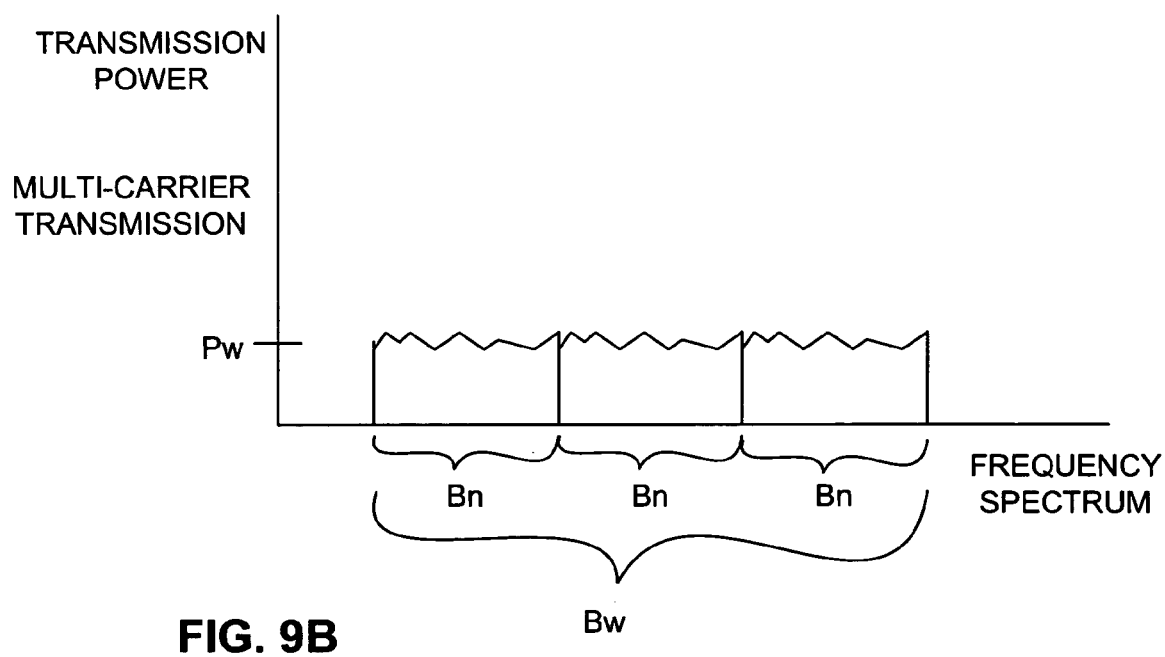

FIG. 9 contains an illustration of the spectral density and the associated transmission power that would be utilized to transmit N information bits using an exemplary single carrier protocol of 1X (FIG. 9a), and it contains an illustration of the spectral density and the associated transmission power that would be used to transmit the same N information bits using an exemplary multi-carrier protocol of 3X (FIG. 9b).

The single carrier protocol modulates the information bits according to a single carrier modulation scheme and transmits the modulated bits at a transmission power Pn, in a frequency band having a bandwidth of Bn. Hereinafter, a given spectral density will be addressed using cross-product notation. For example, in FIG. 9a, Pn is the power used to generate the signal over a bandwidth Bn; thus, the spectral density of the diagrammed single carrier signal in FIG. 9a would be referred to as Pn×Bn.

The multi-carrier protocol modulates the information bits according to a multi-carrier modulation scheme and transmits the modulated bits at a transmission power of Pw at each frequency band Bn in frequency band Bw. The multi-carrier signal has a full spectral density of Pw×Bw.

The power Pn is greater than Pw, while the bandwidth Bw is greater than the bandwidth Bn. Using 3X as the exemplary multi-carrier protocol and 1X as the exemplary single carrier protocol, the bandwidth Bw is comprised of three Bn-sized chunks. As is seen, the spectral density in a particular bandwidth Bn is much greater for a 1X single carrier signal than it is for a 3X multi-carrier signal. Likewise, the transmission power, Pn, used to generate the spectral density Pn×Bn is approximately three times the power level, Pw, used to generate the spectral density Pw×Bn in each Bn frequency chunk.

Figure 10A:
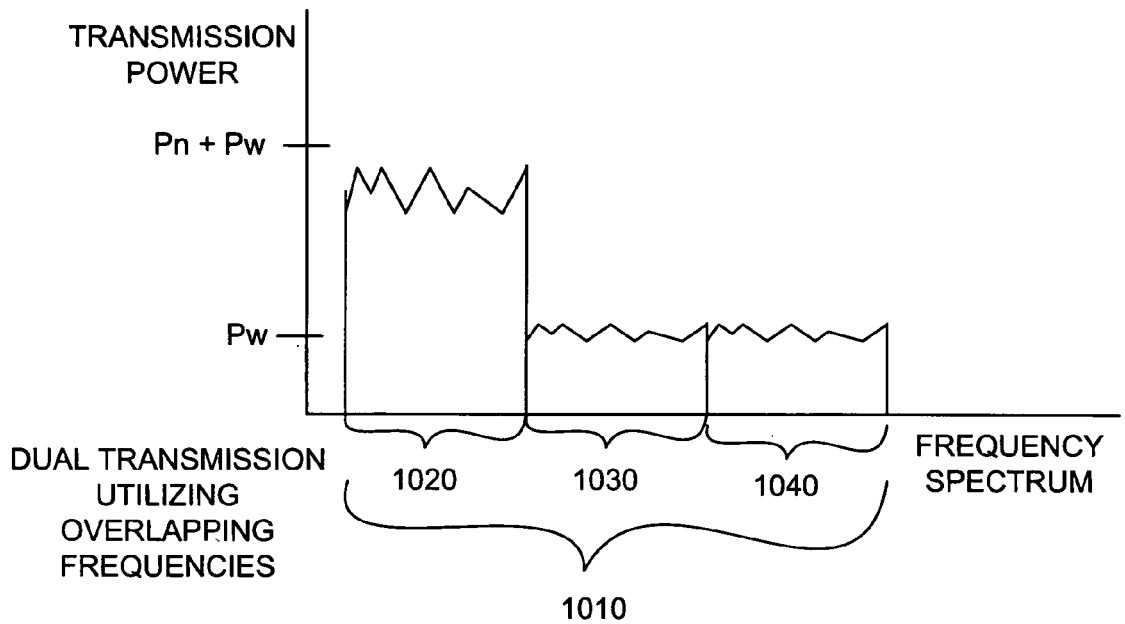
FIG. 10a contains an illustration of the spectral density and the associated transmission power that would be utilized in a first embodiment to simultaneously transmit N information bits using an exemplary single carrier protocol and transmit N information bits using an exemplary multi-carrier protocol.
Figure 10B:
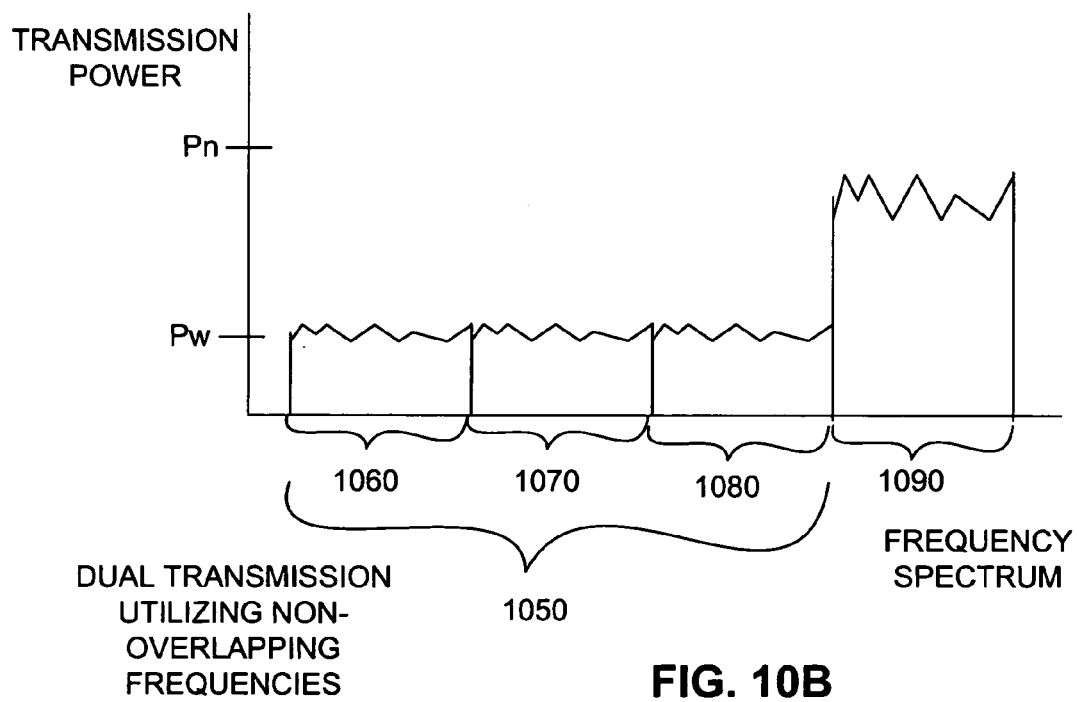
FIG. 10b contains an illustration of the spectral density and the associated transmission power that would be utilized in a second embodiment to simultaneously transmit N information bits using an exemplary single carrier protocol and transmit N information bits using an exemplary multi-carrier protocol.

FIG. 10a and FIG. 10b show two alternate embodiments in which a multi-carrier base station BS3 could simultaneously transmit a single carrier signal to a first remote station and a multi-carrier signal to a second remote station.

In FIG. 10a, the embodiment entitled "Dual Transmission Utilizing Overlapping Frequencies," assumes that in the non-homogenous network 410 the single carrier frequency band Nf is contained within the multi-carrier frequency band Wf. Such a non-homogenous network will hereinafter be referred to as an overlapping non-homogenous network. Diagrammed in FIG. 10a is the transmission power and spectral density utilized in various frequency bands to transmit to two remote stations, the first of which is in a soft-handoff of the second handoff embodiment, wherein the single carrier protocol is a 1X protocol, the second of which is communicating with BS3 in accordance to a 3X multi-carrier protocol. In an overlapping non-homogenous network, multi-carrier base station BS3 transmits in frequency band 1010, which is comprised of frequency bands 1020, 1030, and 1040, a signal modulated in accordance with a multi-carrier protocol that is intended for the second remote station. Additionally, multi-carrier base station BS3 transmits in frequency band 1020 a signal, modulated in accordance with a single carrier protocol, intended for the first remote station. Assuming that a different power amplifier is used for each band 1020, 1030, and 1040, the transmission power used by each amplifiers of BS3 to generate the spectral density of the multi-carrier signal in frequency bands 1030 and 1040 is Pw. The transmission power used by the amplifier of BS3 to generate the spectral density of the single carrier and multi-carrier signal in frequency band 1020 is a Pn+Pw, a sum of the transmission power needed to transmit the single carrier modulated signal and the transmission power needed to transmit the multi-carrier modulated signal. Frequency band 1010 is representative of Wf, and frequency band 1020 is representative of Nf.

Figure 11:
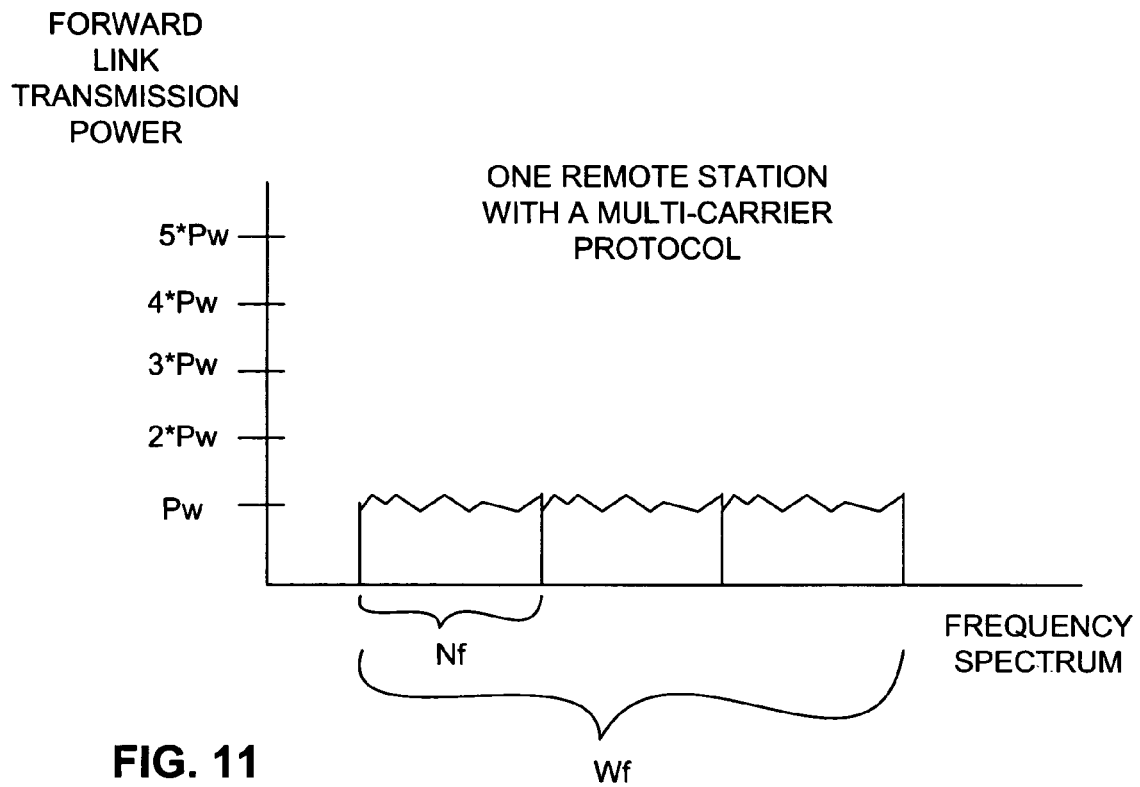
FIG. 11 contains an illustration of the spectral density and the associated forward link transmission power that would be utilized to transmit N information bits using an exemplary multi-carrier protocol.
Figure 12:
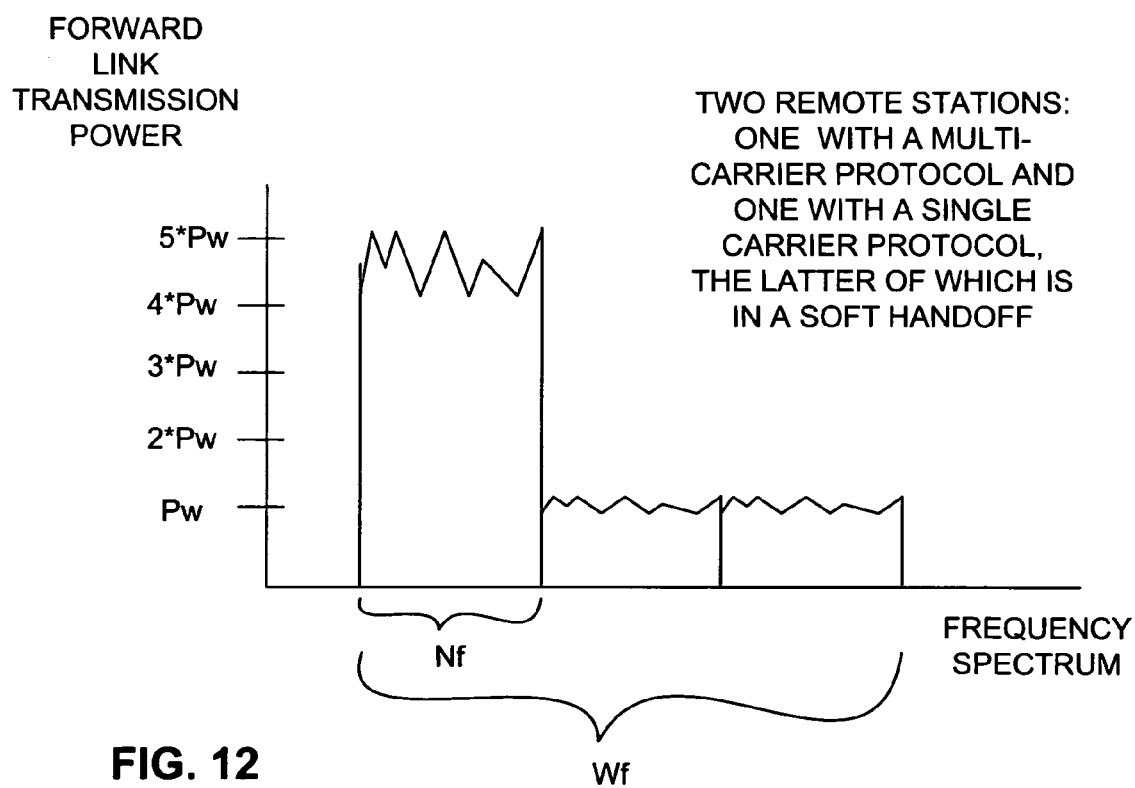
FIG. 12 contains an illustration of the spectral density and the associated forward link transmission power that would be utilized in a first embodiment to simultaneously transmit N information bits using an exemplary single carrier protocol and transmit N information bits using an exemplary multi-carrier protocol.

In FIG. 10b, the embodiment entitled "Dual Transmission Utilizing Non-overlapping Frequencies," assumes that in the non-homogenous network 410 the single carrier frequency band Nf is located outside the multi-carrier frequency band Wf. Such a non-homogenous network will hereinafter be referred to as a non-overlapping non-homogenous network. Diagrammed in FIG. 10b is the transmission power utilized in various frequency bands to transmit to two remote stations, the first of which is in a soft-handoff of the second handoff embodiment, wherein the single carrier protocol is a 1X protocol, the second of which is communicating with BS3 in accordance to a 3X multi-carrier protocol. In a non-overlapping non-homogenous network, multi-carrier base station BS3 transmits in frequency band 1050, which comprises frequency bands 1060, 1070, and 1080, a signal modulated in accordance with a multi-carrier protocol that is intended for the second remote station. Additionally, multi-carrier base station BS3 transmits in frequency band 1090, a signal modulated in accordance with a single carrier protocol intended for the first remote station. Assuming that a different power amplifier is used for each band 1060, 1070, and 1080, the transmission power used by each amplifier of BS3 to generate the spectral density of the multi-carrier signal in frequency bands 1060, 1070, and 1080, is Pw. The transmission power used by an amplifier of BS3 to generate the spectral density of the single carrier signal in frequency band 1090 is Pn. In this case, frequency band 1050 is representative of Wf, and frequency band 1090 is representative of Nf. As described above, the second handoff embodiment of the present invention could affect power levels. Telecommunications systems, such as cdma2000 systems, are generally power limited in the sense that each amplifier can only transmit a certain amount of power. In an overlapping non-homogenous network, this has ramifications as follows. As an example, consider a multi-carrier base station BS3, in a non-homogenous network, each BS3 amplifier having a maximum transmission power limit of 5*Pw. This means that BS3 could support communications with up to five remote stations simultaneously. However, this number decreases when BS3 communicates in single carrier mode with remote stations that are in soft handoff. FIG. 11 and FIG. 12 serve to visualize this.

In FIG. 11, the transmission power of one multi-carrier call is illustrated, wherein 5*Pw is the maximum allowable transmission power level for a given multi-carrier base station BS3. It should be clear to one skilled in the art that given this maximum power level, multi-carrier base station BS3 could still support four more calls in addition to the one call currently up, because each multi-carrier call utilizes an average transmission power level of Pw per amplifier. However, bringing up a single carrier call on this same base station drastically reduces this capacity, as illustrated in FIG. 12.

In FIG. 12, the transmission power of one multi-carrier call in conjunction with a single carrier call on a multi-carrier base station BS3 is illustrated. It should be clear to one skilled in the art that only one more multi-carrier call can be added at this point, and that no more soft handoff calls can be added to at this point due to the near saturation power level of the amplifier supporting frequency band Nf.

Although the example of a power limit of 5*Pw is smaller than one could expect in a real system, it serves to clearly illustrate that the available multi-carrier call capacity of a multi-carrier base station can decrease as the base station begins to transmit data on the forward link in compliance with a single carrier protocol. Thus, in an overlapping non-homogenous network, the second handoff embodiment can have a deleterious effect on multi-carrier call capacity. This deleterious effect does not occur in a non-overlapping non-homogenous network, as multi-carrier base station BS3 would use two distinctly separate frequencies for multi-carrier calls and single carrier calls, wherein each frequency is supported by its own amplifier, as illustrated in FIG. 10$b$. However, it might be more costly to purchase the rights to the extra frequency spectrum needed to create a non-overlapping non-homogenous network, and the deployment costs for the extra transmitters might prove costly as well.

Also, looking at the spectral density distribution in FIG. 12, one skilled in the art will understand that for each remote station in a handoff of the second handoff embodiment, interference in the single carrier frequency band Nf (1020 in FIG. 10$a$) is higher than it would be if either the base station BS3 transmitted data to the multi-carrier handoff candidate in accordance with a single carrier protocol in a frequency band other than Nf, or if base station BS3 transmitted data to the multi-carrier handoff candidate in accordance with a multi-carrier protocol (thus distributing the spectral density of the transmission across a wider frequency band).

Another thing to consider in relation to the second handoff embodiment of the present invention is that, while the remote station is in soft-handoff, the fact that it is only engaging in single carrier communications will limit the forward link data transmission rate. This is a very important consideration. In many communication systems, the multi-carrier protocols provide a means for a remote station to receive much more data on the forward link than do single carrier protocols. Thus, one advantage that the first handoff embodiment has over the second handoff embodiment is that higher data rate transmission can begin occurring while the remote station is within multi-carrier coverage in the first handoff embodiment, whereas in the second handoff embodiment, a remote station would not begin receiving higher data rate transmissions until it is out of single carrier coverage.

Figure 1:
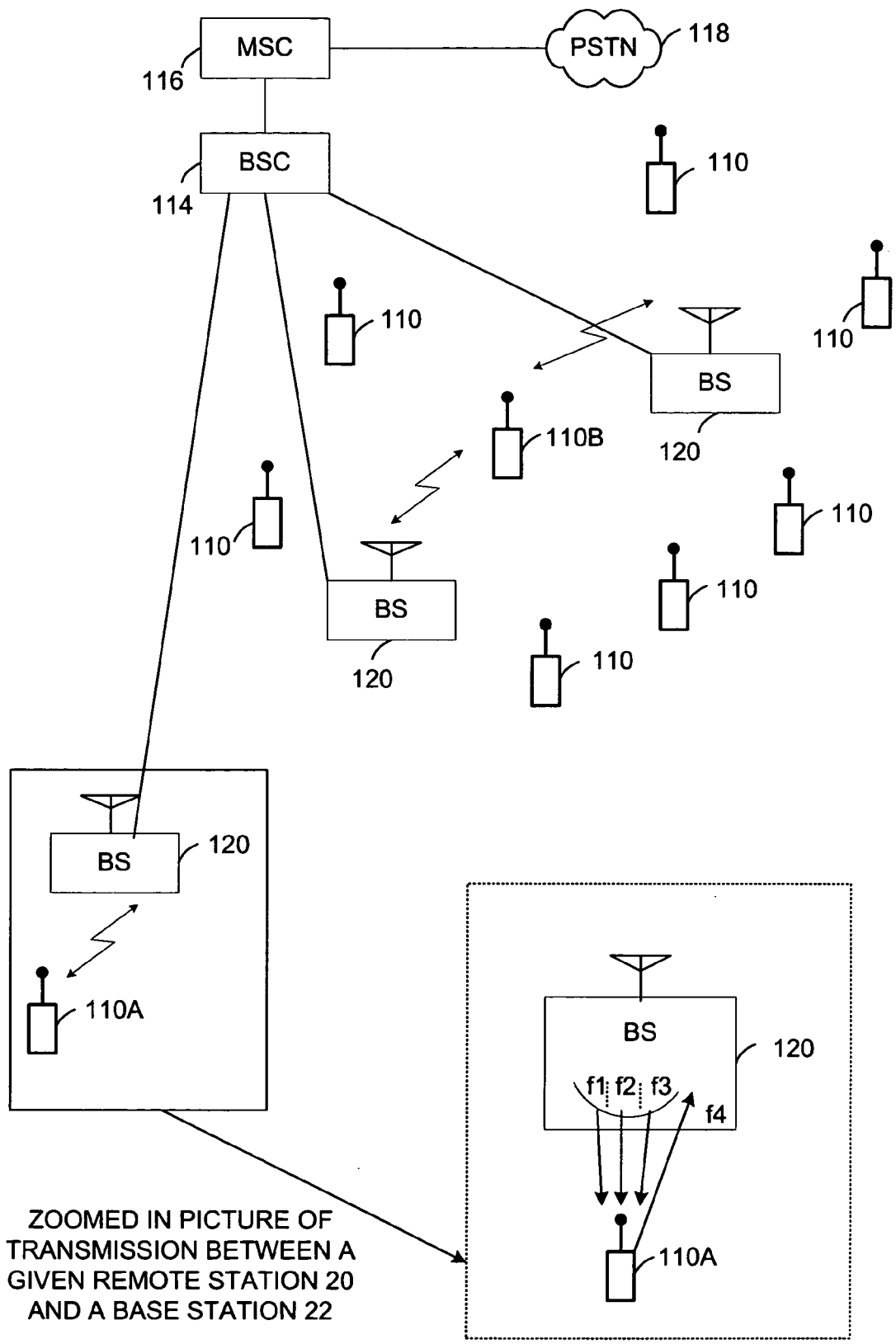
FIG. 1 is a block diagram of an exemplary simplified cellular telephone system that uses multi-carrier transmissions on the forward link and single carrier transmissions on the reverse link, wherein a 3X protocol is used on the forward link and a 1X protocol is used on the reverse link.
Figure 2:
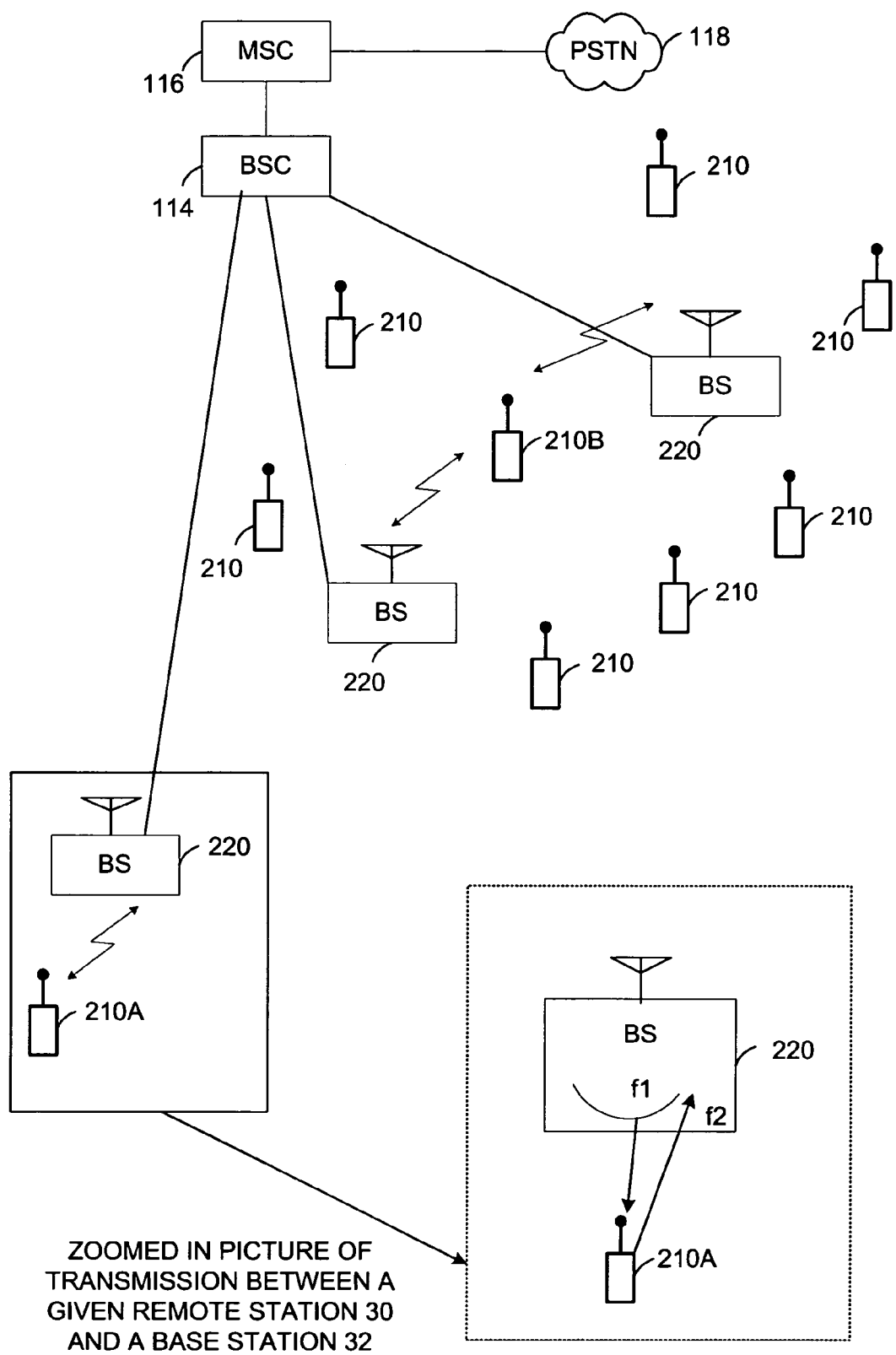
FIG. 2 is a block diagram of an exemplary simplified cellular telephone system that uses single carrier transmissions on the forward link and single carrier transmissions on the reverse link.
Figure 3:
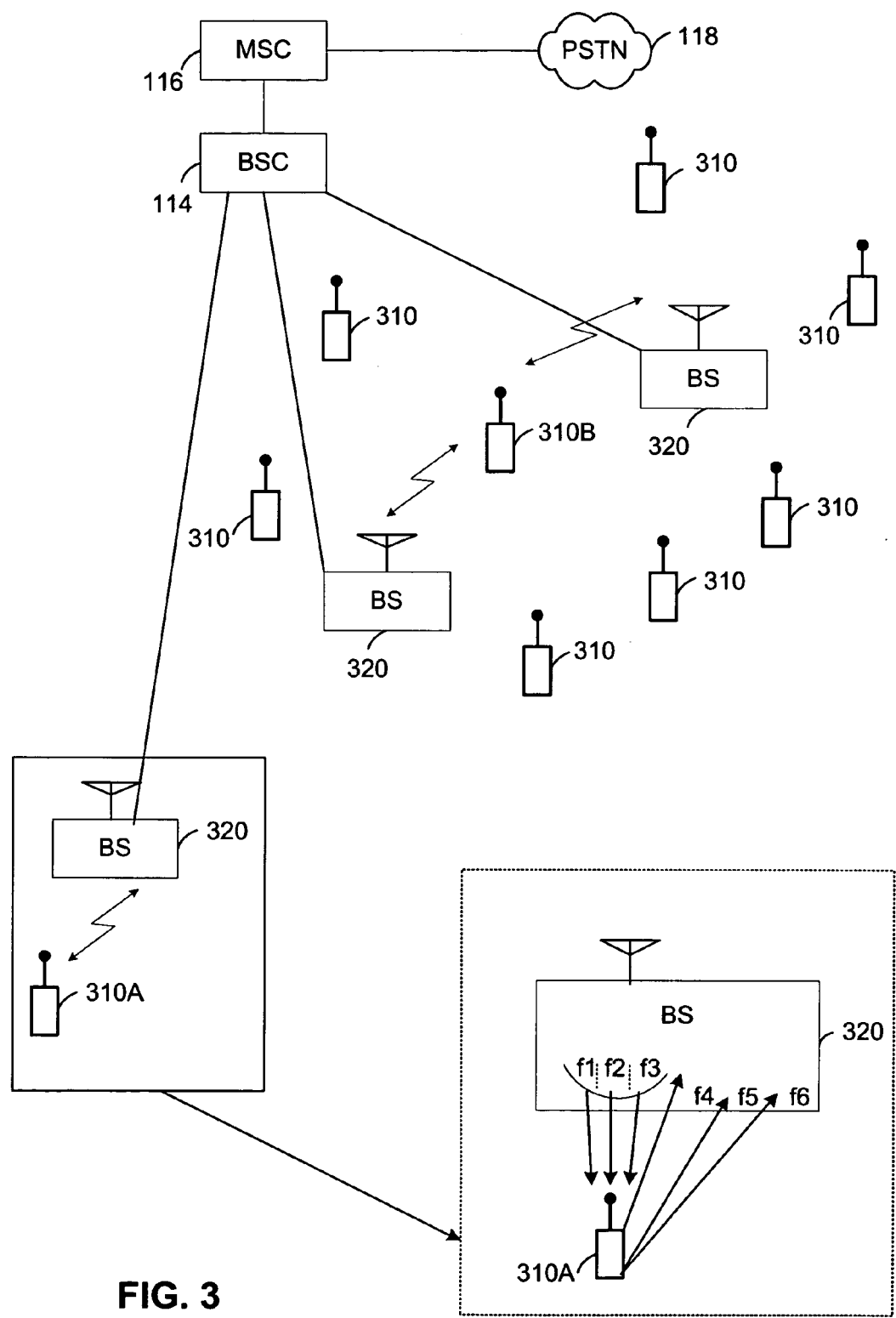
FIG. 3 is a block diagram of an exemplary simplified cellular telephone system that uses multi-carrier transmissions on the forward link and multi-carrier transmissions on the reverse link.

Other embodiments of the present invention combine the advantages of the first handoff embodiment with those of the second handoff embodiment. In the below handoff embodiments, a multi-carrier handoff candidate is sent a handoff message that instructs the remote station to switch its mode of reception to a multicarrier mode, but to transmit in a single carrier mode. In other words, the multi-carrier handoff candidate is sent a message that has it switch from a mode wherein it behaves like remote station 220$a$ of FIG. 2 to a mode wherein it behaves like remote station 110$a$ of FIG. 1. Several of these embodiments are described below.

Figure 13:
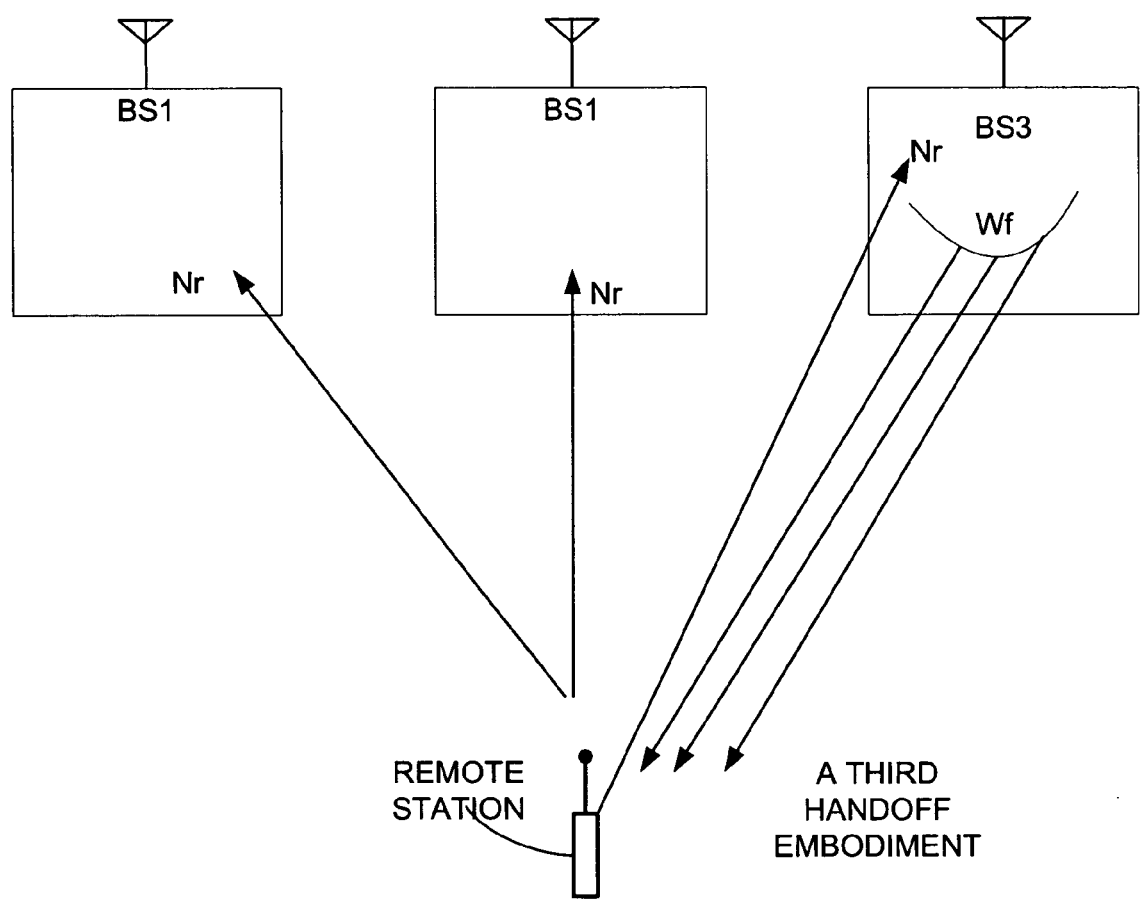
FIG. 13 is a diagram of an exemplary communication path during the handoff of a third handoff embodiment.

In FIG. 13, in a third handoff embodiment of the present invention, a multi-carrier handoff candidate is sent a handoff message that instructs the remote station to continue transmitting data in accordance with a single carrier protocol in Nr, and to begin receiving data in accordance with a multi-carrier protocol in Wf from at least one multi-carrier base station BS3. In this embodiment, the remote station uses the same frequency band Nr for the transmission of data after the handoff as it used for the transmission of data before the handoff. The infrastructure instructs these multi-carrier base stations BS3 to begin transmitting data to the remote station on the forward link using the multi-carrier protocol in frequency band Wf. Additionally, the infrastructure instructs these multi-carrier base stations BS3 to begin receiving reverse link transmissions from the remote station in accordance with the single carrier protocol in frequency band Nr. For instance, if the handoff were to occur at point 520, multi-carrier base station BS3$b$ would be instructed to begin transmitting data to the remote station in frequency band Wf in accordance with the multi-carrier protocol. Additionally, single carrier base stations BS1$d$ and BS1$e$ would be instructed to stop transmitting data to the remote station, but would be instructed, either actively (by instruction) or passively (by lack of instruction), to continue receiving single carrier communications in frequency band Nr from the remote station. The remote station would be instructed, via a handoff message, to continue transmitting data as it was before, in accordance with the single carrier protocol in frequency band Nr, but to begin receiving data in accordance with the multi-carrier protocol on frequency Wf from base station BS3$b$. A diagram of an exemplary communication path after the handoff of the third embodiment appears in FIG. 13, wherein the remote station continues transmitting in frequency band Nr, and begins receiving in frequency band Wf, and wherein transmissions adhering to the single carrier protocol are received by two single carrier base stations BS1 and one multi-carrier base station BS3, and wherein base station BS3 begins transmitting in accordance with the multi-carrier protocol in frequency band Wf.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the third handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch their modes of communications with the remote station to the multi-carrier protocol in frequency bands Wf and Wr.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

Figure 14:
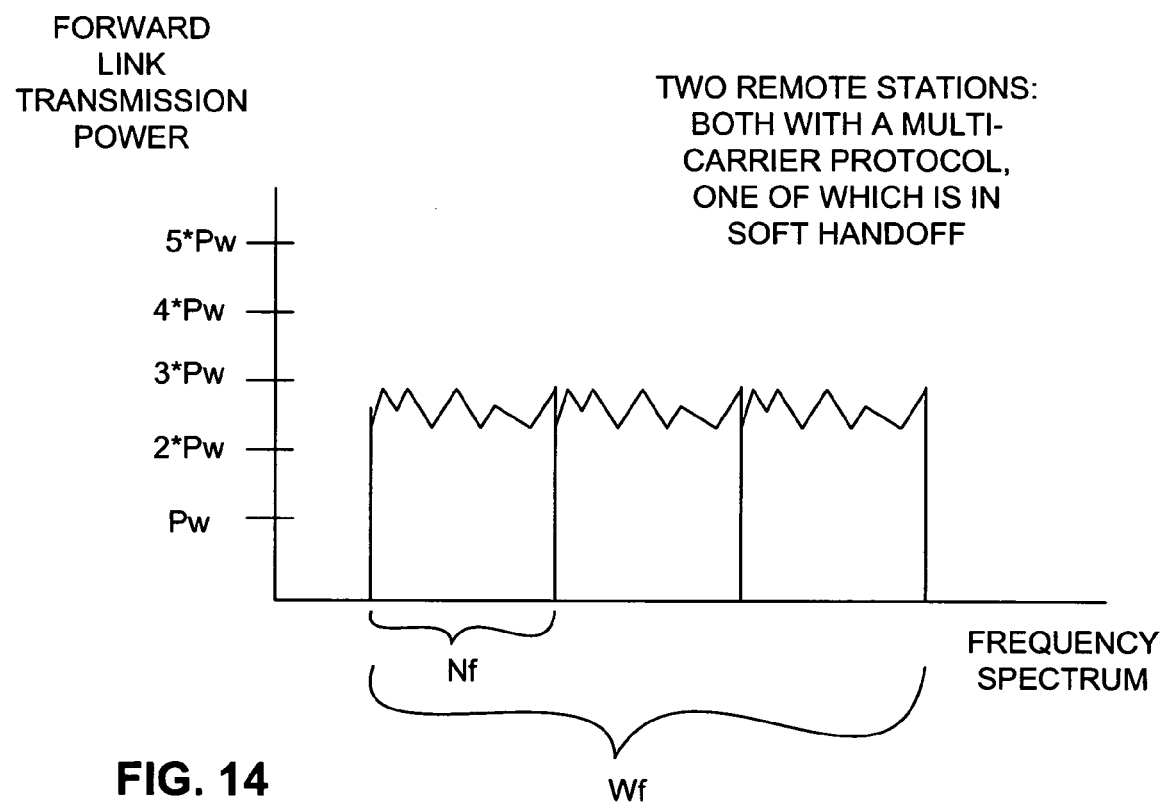
FIG. 14 contains an exemplary illustration of the spectral density and the associated forward link transmission power that would be utilized to transmit N information bits to two remote stations using an exemplary multi-carrier protocol to communicate with each remote station.

This third handoff embodiment offers improvements over the second handoff embodiment in relation to the considerations that were discussed earlier. In the third handoff embodiment, the transmission power used by the multi-carrier base stations to transmit to the remote station is not disproportionately increased on one channel. For instance, FIG. 12 illustrated that during soft handoff of a method of the second handoff embodiment, a multi-carrier base station BS3 would be limited (due to transmit power limitations) to supporting one more multi-carrier call, and would not be able to support any more soft handoffs. However, given a similar situation, in which a single multi-carrier call and a single soft handoff are in progress, but wherein the single soft handoff is performed according to the method of the third handoff embodiment, a multi-carrier base station's transmit power limitations do not cause such severe limitations. This is because, in the method of the third handoff embodiment, the remote station in handoff is sent multi-carrier signals rather than single carrier signals. Power transmission on a multi-carrier base station that was servicing one remote station prior to engaging in a soft handoff with another remote station, as illustrated in FIG. 11, would therefore transition to a power transmission state like that shown in FIG. 14 after initiating a soft handoff with another remote station per the method of the third handoff embodiment. As shown in FIG. 14, the transmission power for the remote station in handoff is evenly spread across the three sub-bands of frequency band Wf. Thus, in this example, wherein max transmission power level is 5*Pw, and wherein a soft-handoff per the method of the third handoff embodiment is in with one remote station while another multi-carrier call is in progress with another remote station, it is seen that the multi-carrier base station is able to transmit to three more remote stations, each of which can either be in a pure multi-carrier mode or in a soft-handoff mode. This is a vast improvement over the power limitations that occur due to the soft handoff of the second handoff embodiment, as described in relation to FIG. 12.

Another way in which the third handoff embodiment has advantages over the method of the second handoff embodiment is that higher data rate transmission can begin occurring on the forward link as soon as the remote station enters multi-carrier coverage.

Although the third handoff embodiment does offer some advantages, some considerations should be taken into account with the third handoff embodiment. For instance, although the third handoff embodiment provides path diversity on the reverse link, it does not provide the path diversity on the forward link that is provided for by the method of the second handoff embodiment. Additionally, the third handoff embodiment only provides power control feedback from the multi-carrier base station while in soft handoff. As discussed in reference to the first handoff embodiment, a remote station that is only receiving power control feedback from the multi-carrier base stations could inadvertently transmit at an excessively high power, and thus interfere with the single carrier base stations whose coverage the remote station is in. A solution to this problem of power control can be provided in this handoff embodiment, as well as in any others that have the aforementioned power control problem.

Figure 15:
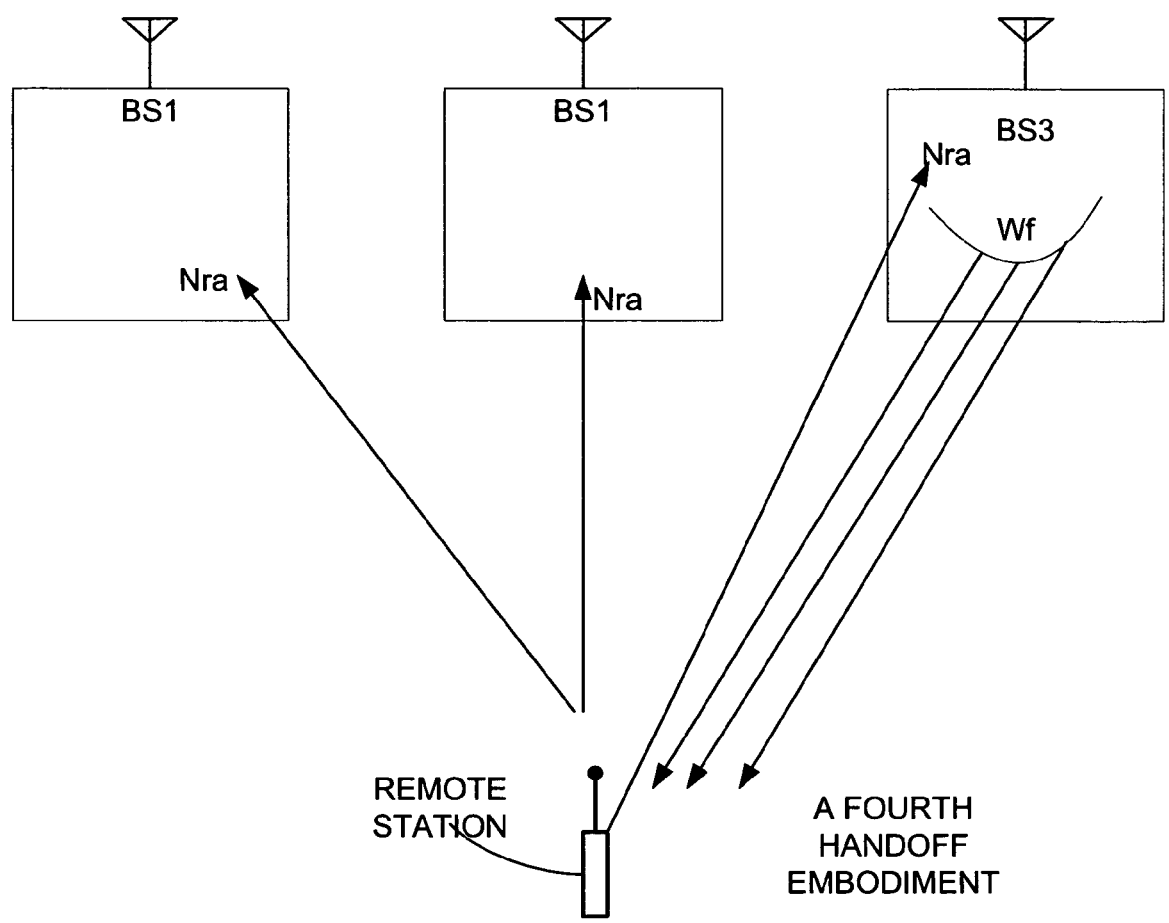
FIG. 15 is a diagram of an exemplary communication path during the handoff of a fourth handoff embodiment.

Such a solution is as follows. One or more of the single carrier base stations BS1 that is receiving transmissions from the remote station generates a message containing power control information related to the remote station in question. The information can be as simple as whether the remote station should lower its power, or it can contain more detailed information on the signal being received from the remote station in question. The single carrier base stations send these messages via the infrastructure backhaul to one or more multi-carrier base stations that are communicating with the remote station. Knowledge of the backhaul and how to send messages over it would be known by one skilled in the art. The multi-carrier base station uses this received information when determining whether it should send a power control bit to the remote station that indicates an increase or a decrease in transmission power. Due to delays and bandwidth constraints on the backhaul, however, this solution will likely prove impractical. In such a case, the problem of possible interference in the single carrier system due to excessive transmission power by the remote station would remain in the third handoff embodiment In FIG. 15, a fourth handoff embodiment addresses the problem of interference on the reverse link in a different manner. In the fourth handoff embodiment, a soft handoff similar to that found in the third handoff embodiment is used, wherein multi-carrier communications are used by the multi-carrier base stations to transmit data to the remote station on the forward link, and wherein single carrier communications are used by the remote station to transmit data to the base stations on the reverse link. The difference between the third handoff embodiment and the fourth handoff embodiment is as follows. In the soft handoff of the third handoff embodiment, the remote station transmits data in the single carrier frequency band Nr both before and after the handoff. In contrast, in the fourth handoff embodiment the remote station transmits data after handoff in a single carrier frequency band that is different from the single carrier frequency band used prior to handoff. This difference is illustrated by transforming the labeling of the reverse link in FIG. 13 from Nr to a label of Nra, as shown in FIG. 15. Whereas Nr is representative of the reverse link frequency band used by the single carrier systems for remote stations that are not in soft-handoff with multi-carrier base stations (and it is also representative of the reverse link frequency band used by remote stations involved in a handoff of the second and third embodiments), Nra is representative of a single carrier frequency band reverse link that is located outside of the frequency band Nr. By having the remote station utilize a different single carrier frequency band for the reverse link while in soft handoff, it removes the problem of possible interference in the single carrier system due to the use of excessive transmission power by the remote station. The alternative single carrier reverse link frequency band, denoted by Nra in FIG. 15, is contained within the frequency band Wr in an exemplary embodiment. In an alternative embodiment, Nra is contained outside the frequency band Wr.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the fourth handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

In the fourth handoff embodiment, the infrastructure instructs the remote station, via a handoff message, to begin transmitting data in accordance with a single carrier protocol in frequency band Nra, and to begin receiving data in accordance with a multi-carrier protocol in frequency band Wf from at least one multi-carrier base station BS3. The infrastructure instructs these multi-carrier base stations BS3 to begin transmitting data to the remote station on the forward link using the multi-carrier protocol in frequency band Wf. Additionally, the infrastructure instructs these multi-carrier base stations BS3 to begin receiving reverse link transmissions from the remote station in accordance with the single carrier protocol in frequency band Nra. Also, the infrastructure instructs the single carrier base stations BS1 involved in the handoff to switch its reception of reverse link transmission from the remote station from frequency band Nr to frequency band Nra (described in reference to the fourth handoff embodiment).

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the fourth handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

Figure 16:
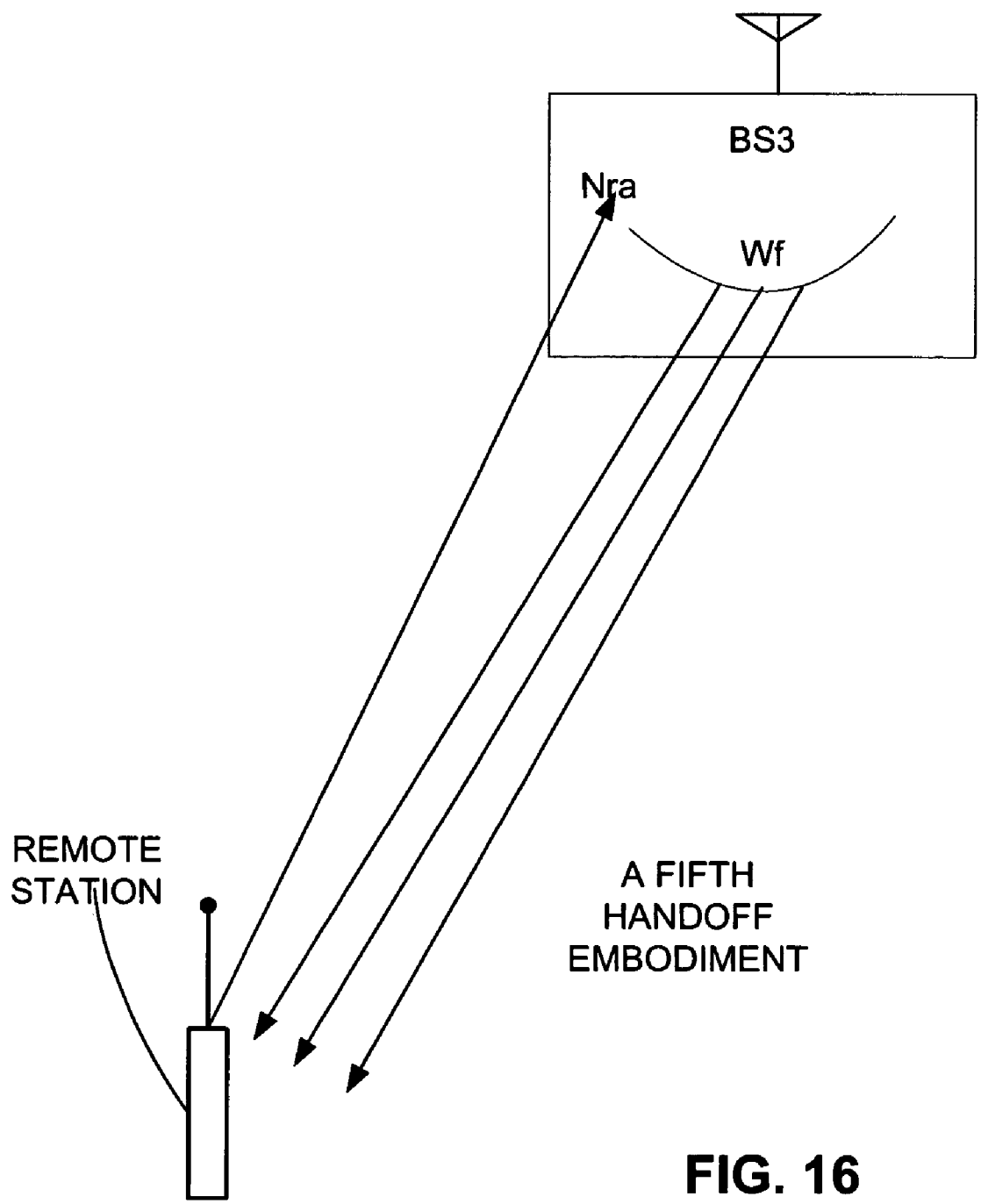
FIG. 16 is a diagram of an exemplary communication path during the handoff of a fifth handoff embodiment.

FIG. 16 illustrates a remote station in a handoff of a fifth handoff embodiment, which differs from the fourth handoff embodiment only in that the single carrier base stations do not receive the reverse link transmissions from the remote station that is in a soft-handoff. Although it is desirable that the single carrier base stations receive the single carrier transmissions from the remote station for path diversification, it may be cost prohibitive to configure the single carrier base stations BS1 to receive single carrier signals in two frequency bands, one for remote stations not in soft handoff, and one for remote stations in soft handoff. The fifth handoff embodiment can be used in cases wherein it is not desired to perform the configurations needed to receive transmissions in two frequency bands on single carrier base stations BS1. In the fifth handoff embodiment, the multi-carrier base stations BS3 and the remote station perform the same way as in the fourth handoff embodiment. The only difference, in fact, between the fourth and the fifth handoff embodiment are that the single carrier base stations BS1 is not used for communications with the remote station after a handoff of the fifth handoff embodiment.

In the fifth handoff embodiment, the infrastructure instructs the remote station, via a handoff message, to stop communicating with the single carrier base stations BS1 and to begin transmitting data in accordance with a single carrier protocol in frequency band Nra, and to begin receiving data in accordance with a multi-carrier protocol in frequency band Wf from at least one multi-carrier base station BS3. In such an embodiment, the infrastructure instructs these multi-carrier base stations BS3 to begin transmitting data to the remote station on the forward link using the multi-carrier protocol in frequency band Wf. Additionally, the infrastructure instructs these multi-carrier base stations BS3 to begin receiving reverse link transmissions from the remote station in accordance with the single carrier protocol in frequency band Nra. Also, the infrastructure instructs the single carrier base stations BS1 to stop communications with the remote station.

The disadvantage of the fifth handoff embodiment over the fourth handoff embodiment is that reverse link path diversity that was provided by the fourth handoff embodiment is not present in the fifth handoff embodiment.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the fifth handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

One thing that is not provided for in any of the aforementioned handoff embodiments in which the forward link transmissions adhere to the multi-carrier protocol (namely, the third-fifth embodiments) is forward link path diversity from both the single carrier and the multi-carrier base stations. However, in the handoff embodiments described below, forward link path diversity from both the single carrier and the multi-carrier base stations is achieved, at least in part. This is done by configuring the single carrier base stations BS1 to transmit signals to the remote station in the single carrier frequency band Nf, wherein the transmitted signal is a portion of a signal that was generated in accordance with the multi-carrier protocol. The concept of transmitting in a single carrier frequency band a portion of a signal that was generated in accordance with a multi-carrier protocol is described below.

A multi-carrier frequency band can be logically partitioned into several sections, each having a frequency bandwidth of a single carrier frequency band. In an exemplary system wherein Nf is contained within Wf, and wherein single carrier transmissions are performed using the 1X protocol and multi-carrier transmissions are performed using the 3X protocol, the multi-carrier frequency band Wf can be partitioned into three sub-bands, which will be called Wfa, Wfb, and Wfc, wherein each sub-band has a width equal to that of Nf. In an exemplary case, Nf is the same frequency band as Wfc. However, it will be understood by one skilled in the art that Nf can be present anywhere within Wf.

Figure 17A:
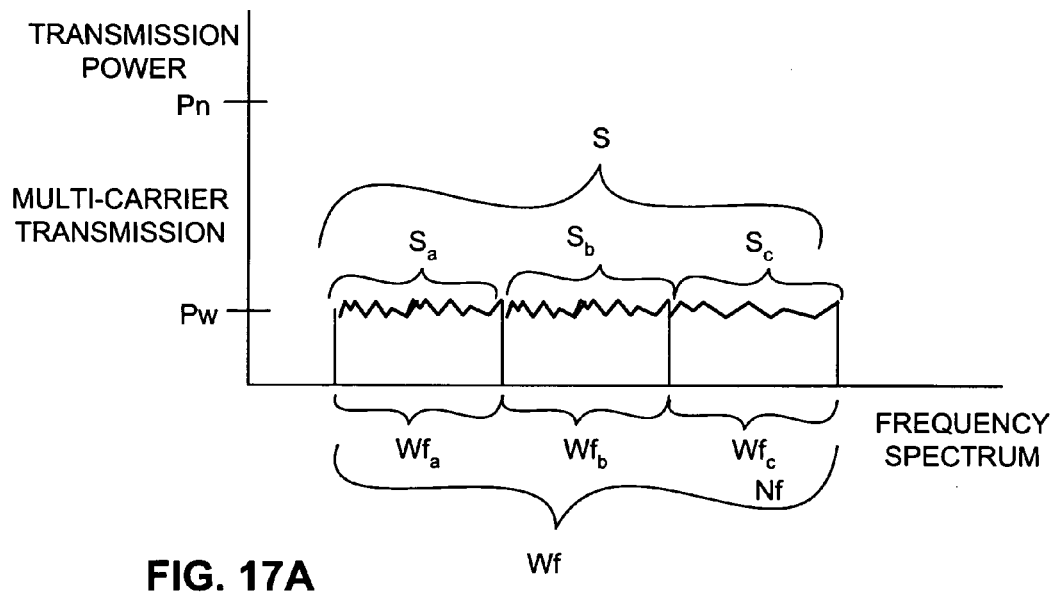
FIG. 17a contains an exemplary illustration of a transmitted multi-carrier signal.
Figure 17B:
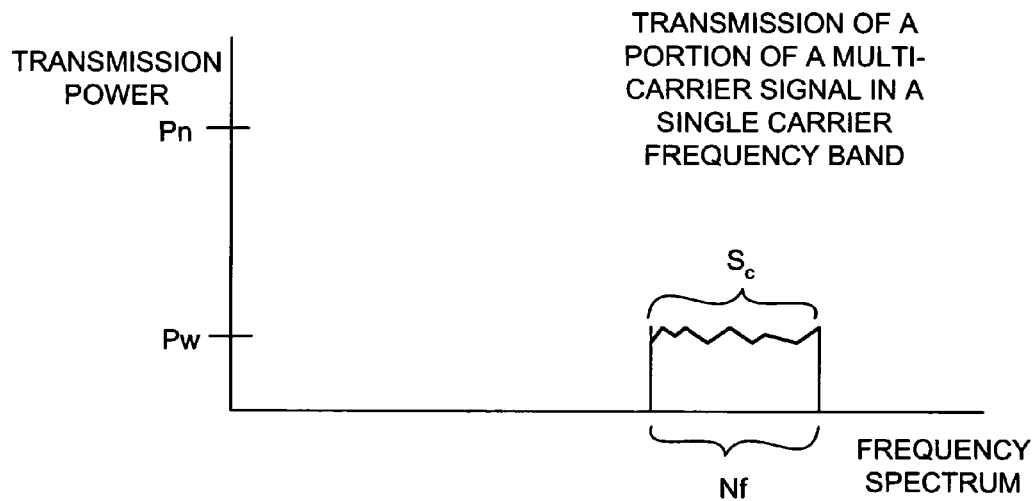
FIG. 17b contains an exemplary illustration of a portion of the multi-carrier signal shown in FIG. 17a that can be transmitted in a single carrier frequency band.

FIG. 17a illustrates this exemplary case, in which Wf is divided into three sub-bands, each of equal width, wherein the third sub-band, Wfc, is the same frequency band as the single carrier frequency band Nf. FIG. 17a also shows an exemplary multi-carrier signal, S, that would be transmitted in Wf. The signal S can likewise be broken up into three sub-signals, Sa, Sb, and Sc, each of which is transmitted over their respective sub-band. In this case Sc is transmitted over frequency band Nf (also known as Wfc). In the below described handoff embodiments, the entire multi-carrier signal, signal S, will be transmitted in frequency band Wf by the multi-carrier base stations. Sc is a portion of the signal, S, generated in accordance with the multi-carrier protocol, that is transmitted in the frequency band Nf. To gain path diversity for this portion of the signal, in the below described handoff embodiments, the single carrier base stations BS1 that are transmitting signals in frequency band Nf in accordance with the single carrier protocol additionally transmit the portion of the multi-carrier signal that was transmitted in the frequency band Nf by the multi-carrier base stations. For instance, if a signal were generated and transmitted as per FIG. 17a, then in the handoff embodiments described below the portion Sc would be transmitted by single carrier base stations, as illustrated in FIG. 17b.

Figure 18:
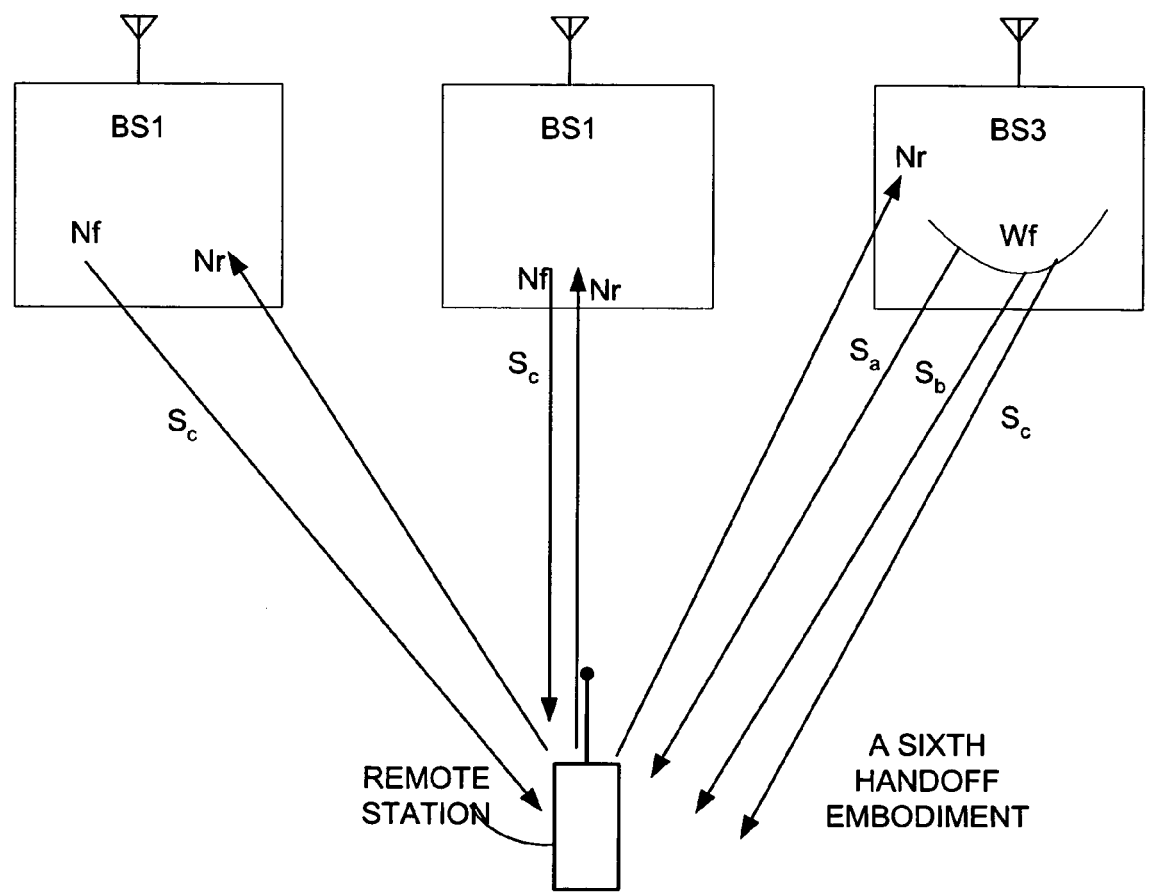
FIG. 18 is a diagram of an exemplary communication path during the handoff of a sixth handoff embodiment.

FIG. 18 illustrates a remote station in a handoff of a sixth handoff embodiment. The sixth handoff embodiment has all of the communication paths of the third handoff embodiment, plus it also has a single carrier forward link communication path between the single carrier base stations BS1 and the remote station. As illustrated, portion Sc of the multi-carrier signal is transmitted over these single carrier forward link communication paths. Portion Sc is also transmitted as part of the multi-carrier signal transmitted by multi-carrier base station BS3. The sixth handoff embodiment has all of the advantages of the third handoff embodiment, and additionally it has the advantage that it gains additional forward link path diversity from the single carrier base stations for the portion of the multi-carrier signal that is transmitted by both the multi-carrier and single carrier base stations.

In the sixth handoff embodiment of the present invention, a multi-carrier handoff candidate is sent a handoff message that instructs the remote station to continue transmitting data in accordance with a single carrier protocol in Nr, and to begin receiving data in accordance with a multi-carrier protocol in Wf from at least one multi-carrier base station BS3. The handoff message also instructs the remote station to begin receiving data in accordance with a multi-carrier protocol in Nf from at least one single carrier base station BS1. In one embodiment the remote station is instructed to only decode the portion of the signal that occurs in the single carrier frequency band because the single carrier base stations BS1 will only be transmitting a portion of the multi-carrier signal.

In an alternative embodiment, the remote station is simply instructed to decode the entire multi-carrier signal from the single carrier base stations BS1. In such an embodiment, although the remote station will not be able to decode the entire expected multi-carrier signal from BS1, but rather only the portion that was transmitted by BS1, the absence of some of the signal will not negatively impact the remote station when decoding the entire multi-carrier signal as received from BS3.

In the sixth handoff embodiment, the remote station uses the same frequency band Nr for the transmission of data after the handoff as it used for the transmission of data before the handoff. In such an embodiment, the infrastructure instructs these multi-carrier base stations BS3 to begin transmitting data to the remote station on the forward link using the multi-carrier protocol in frequency band Wf. Additionally, the infrastructure instructs these multi-carrier base stations BS3 to begin receiving reverse link transmissions from the remote station in accordance with the single carrier protocol in frequency band Nr. Also, the infrastructure instructs these single carrier base stations BS1 to begin generating signals in accordance with a multi-carrier protocol and to transmit in frequency band Nf the portion of each of these signals that will be similarly transmitted in frequency band Nf by the multi-carrier base stations BS3.

Single carrier base stations BS1 are instructed, either actively (by instruction) or passively (by lack of instruction), to continue receiving single carrier communications in frequency band Nr from the remote station.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the sixth handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

Figure 19:
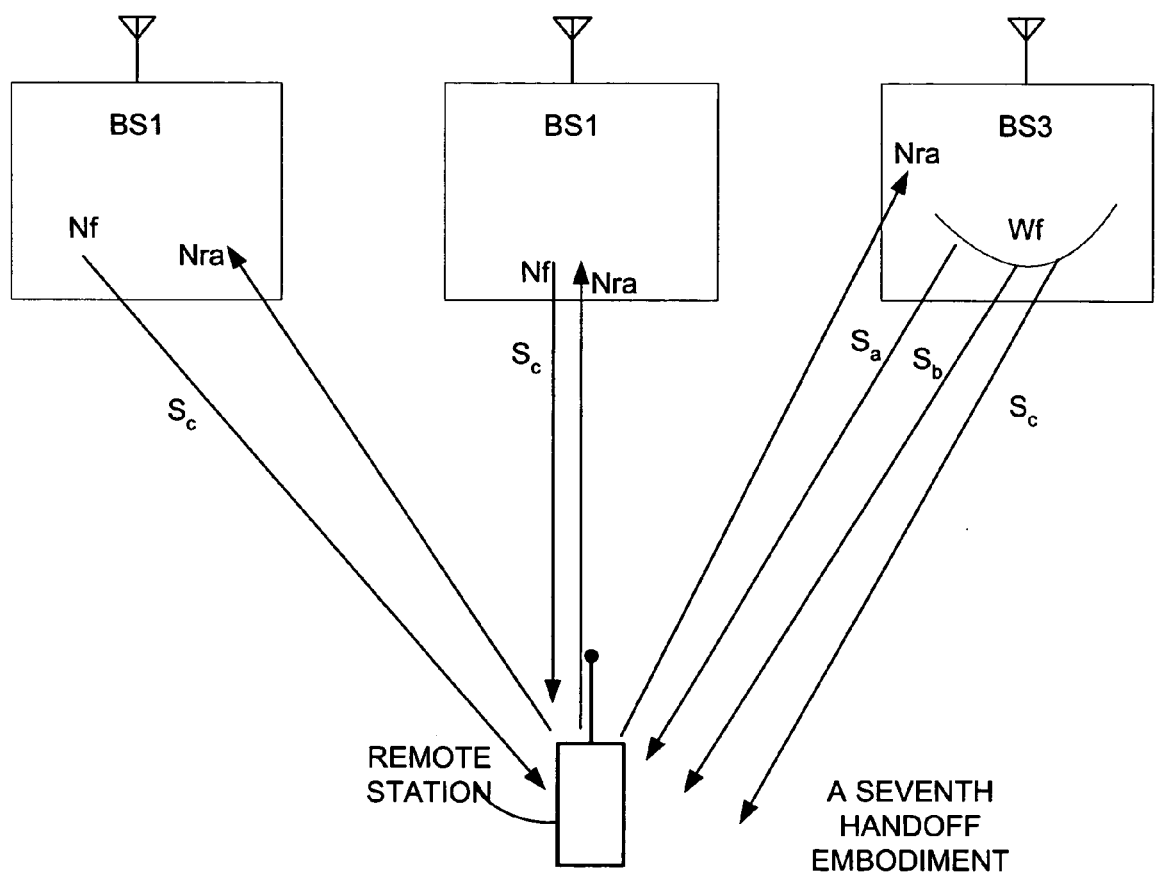
FIG. 19 is a diagram of an exemplary communication path during the handoff of a seventh handoff embodiment.

FIG. 19 illustrates a remote station in a handoff of a seventh handoff embodiment. The seventh handoff embodiment has all of the communication paths of the fourth handoff embodiment, plus it also has a single carrier forward link communication path between the single carrier base stations and the remote station. As illustrated, portion Sc of the multi-carrier signal is transmitted over these single carrier forward link communication paths. Portion Sc is also transmitted as part of the multi-carrier signal transmitted by multi-carrier base station BS3. The seventh handoff embodiment has all of the advantages of the fourth handoff embodiment, and additionally it has the advantage that it gains forward link path diversity for the portion of the multi-carrier signal that is transmitted by both the multi-carrier and single carrier base stations.

In the seventh handoff embodiment, the infrastructure instructs the remote station, via a handoff message, to begin transmitting data in accordance with a single carrier protocol in frequency band Nra (described in reference to the fourth handoff embodiment), and to begin receiving data in accordance with a multi-carrier protocol in frequency band Wf from at least one multi-carrier base station BS3. The handoff message also instructs the remote station to begin receiving data in accordance with a multi-carrier protocol in Nf from at least one single carrier base station BS1. In one embodiment the remote station is instructed to only decode the portion of the signal that occurs in the single carrier frequency band because the single carrier base stations BS1 will only be transmitting a portion of the multi-carrier signal. In an alternative embodiment, the remote station is simply instructed to decode the entire multi-carrier signal from the single carrier base stations BS1. In such an embodiment, although the remote station will not be able to decode the entire expected multi-carrier signal from BS1, but rather only the portion that was transmitted by BS1, the absence of some of the signal will not negatively impact the remote station when decoding the entire multi-carrier signal as received from BS3.

In the seventh embodiment, the infrastructure instructs these multi-carrier base stations BS3 to begin transmitting data to the remote station on the forward link using the multi-carrier protocol in frequency band Wf. Additionally, the infrastructure instructs these multi-carrier base stations BS3 to begin receiving reverse link transmissions from the remote station in accordance with the single carrier protocol in frequency band Nra. Also, the infrastructure instructs these single carrier base stations BS1 to begin generating signals in accordance with a multi-carrier protocol and to transmit in frequency band Nf the portion of each of these signals that will be similarly transmitted in frequency band Nf by the multi-carrier base stations BS3. As well, the infrastructure instructs these single carrier base stations BS1 involved in the handoff to switch its reception of reverse link transmission from the remote station from frequency band Nr to frequency band Nra.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548.

In the seventh handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550.

Figure 20:
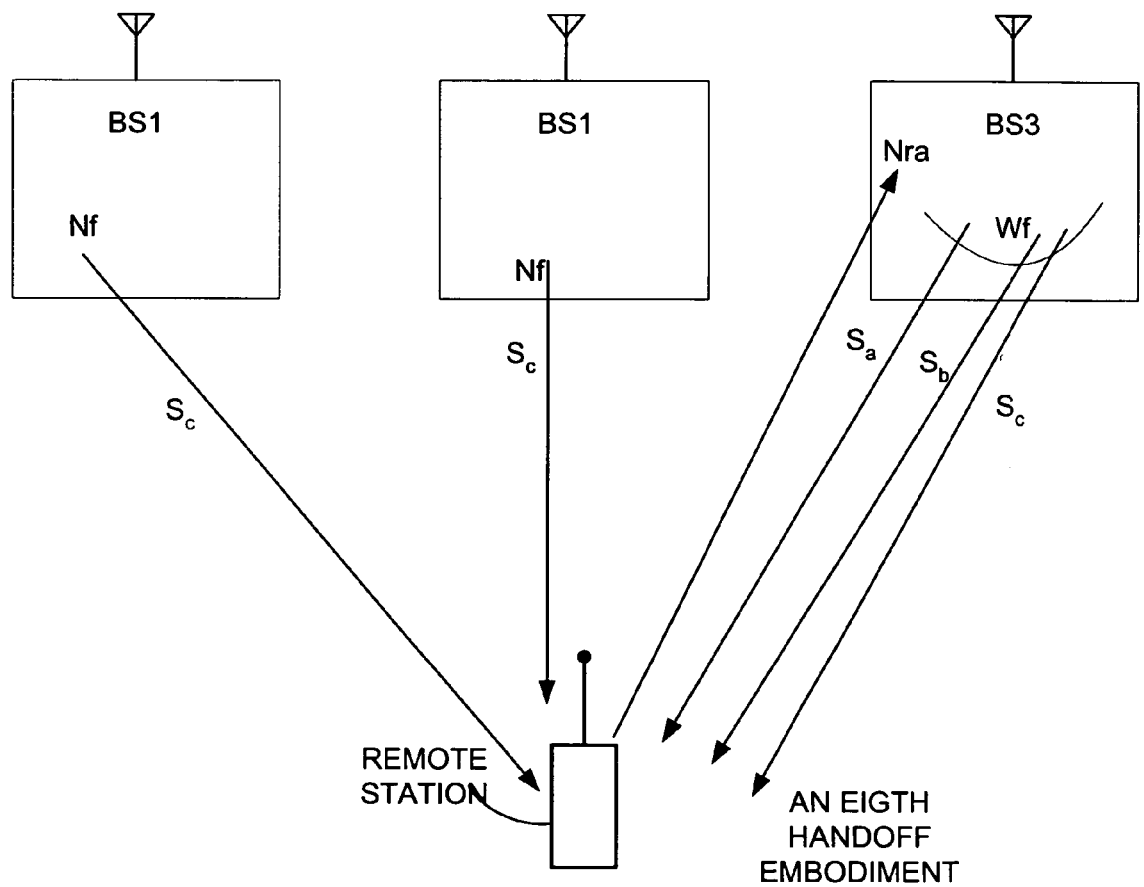
FIG. 20 is a diagram of an exemplary communication path during the handoff of an eighth handoff embodiment.

FIG. 20 illustrates a remote station in a handoff of an eighth handoff embodiment. The eighth handoff embodiment has all of the communication paths of the fifth handoff embodiment, plus it also has a single carrier forward link communication path between the single carrier base stations and the remote station. As illustrated, portion Sc of the multi-carrier signal is transmitted over these single carrier forward link communication paths. Portion Sc is also transmitted as part of the multi-carrier signal transmitted by multi-carrier base station BS3. The eighth handoff embodiment has all of the advantages of the fifth handoff embodiment, and additionally it has the advantage that it gains forward link path diversity for the portion of the multi-carrier signal that is transmitted by both the multi-carrier and single carrier base stations.

In this embodiment, the infrastructure instructs the remote station, via a handoff message, to begin transmitting data in accordance with a single carrier protocol in frequency band Nra (described in reference to the fourth handoff embodiment), and to begin receiving data in accordance with a multi-carrier protocol in frequency band Wf from at least one multi-carrier base station BS3. The handoff message also instructs the remote station to begin receiving data in accordance with a multi-carrier protocol in Nf from at least one single carrier base station BS1. In one embodiment the remote station is instructed to only decode the portion of the signal that occurs in the single carrier frequency band because the single carrier base stations BS1 will only be transmitting a portion of the multi-carrier signal. In an alternative embodiment, the remote station is simply instructed to decode the entire multi-carrier signal from the single carrier base stations BS1. In such an embodiment, although the remote station will not be able to decode the entire expected multi-carrier signal from BS1, but rather only the portion that was transmitted by BS1, the absence of some of the signal will not negatively impact the remote station when decoding the entire multi-carrier signal as received from BS3.

In such an embodiment, the infrastructure instructs these multi-carrier base stations BS3 to begin transmitting data to the remote station on the forward link using the multi-carrier protocol in frequency band Wf. Additionally, the infrastructure instructs these multi-carrier base stations BS3 to begin receiving reverse link transmissions from the remote station in accordance with the single carrier protocol in frequency band Nra. Also, the infrastructure instructs these single carrier base stations BS1 to begin generating signals in accordance with a multi-carrier protocol and to transmit in frequency band Nf the portion of each of these signals that will be similarly transmitted in frequency band Nf by the multi-carrier base stations BS3. Single carrier base stations BS1 are instructed to stop receiving single carrier communications from the remote station.

Although the above describes a handoff from single carrier coverage to mixed coverage (an area that is both in the coverage of a single carrier base station and in the coverage of a multi-carrier base station), which occurs, for instance, at point 520, one skilled in the art will appreciate that a similar method can be used to handoff from multi-carrier coverage to mixed coverage, such as at point 540 or point 548. Example 3, below, speaks to this.

In the eighth handoff embodiment, once the remote station travels to a point at which it is no longer in the coverage of single carrier basestations BS1, such as point 530, a subsequent handoff can occur that will switch the mode of communications from single carrier to multi-carrier. This subsequent handoff comprises the infrastructure sending a handoff message to the remote station instructing it to stop single carrier communications with a set of at least one multi-carrier base station BS3 and to begin multi-carrier communications on the same set of base stations in frequency bands Wf and Wr. In other words, the remote station is sent a handoff message instructing it to cease all single carrier communications, and to only communicate using the multi-carrier protocol on the forward and reverse links. In such an embodiment, the infrastructure instructs the set of multi-carrier base stations BS3 to switch its mode of communications with the remote station to the multi-carrier protocol in frequency bands Wf and Wr. Example 2, below, speaks to this.

A subsequent handoff that tells the remote station to only communicate with one type of base station in that base station's native protocol is not limited to a remote station traveling from a mixed coverage area to a multi-carrier coverage area, such as at point 530. Rather, a subsequent handoff message that instructs a remote station to only communicate with single carrier base station's in a single carrier protocol should be used when a remote station travels from a mixed coverage area to a single carrier coverage area, such as at point 550. Example 4, below, speaks to this.

Figure 21:
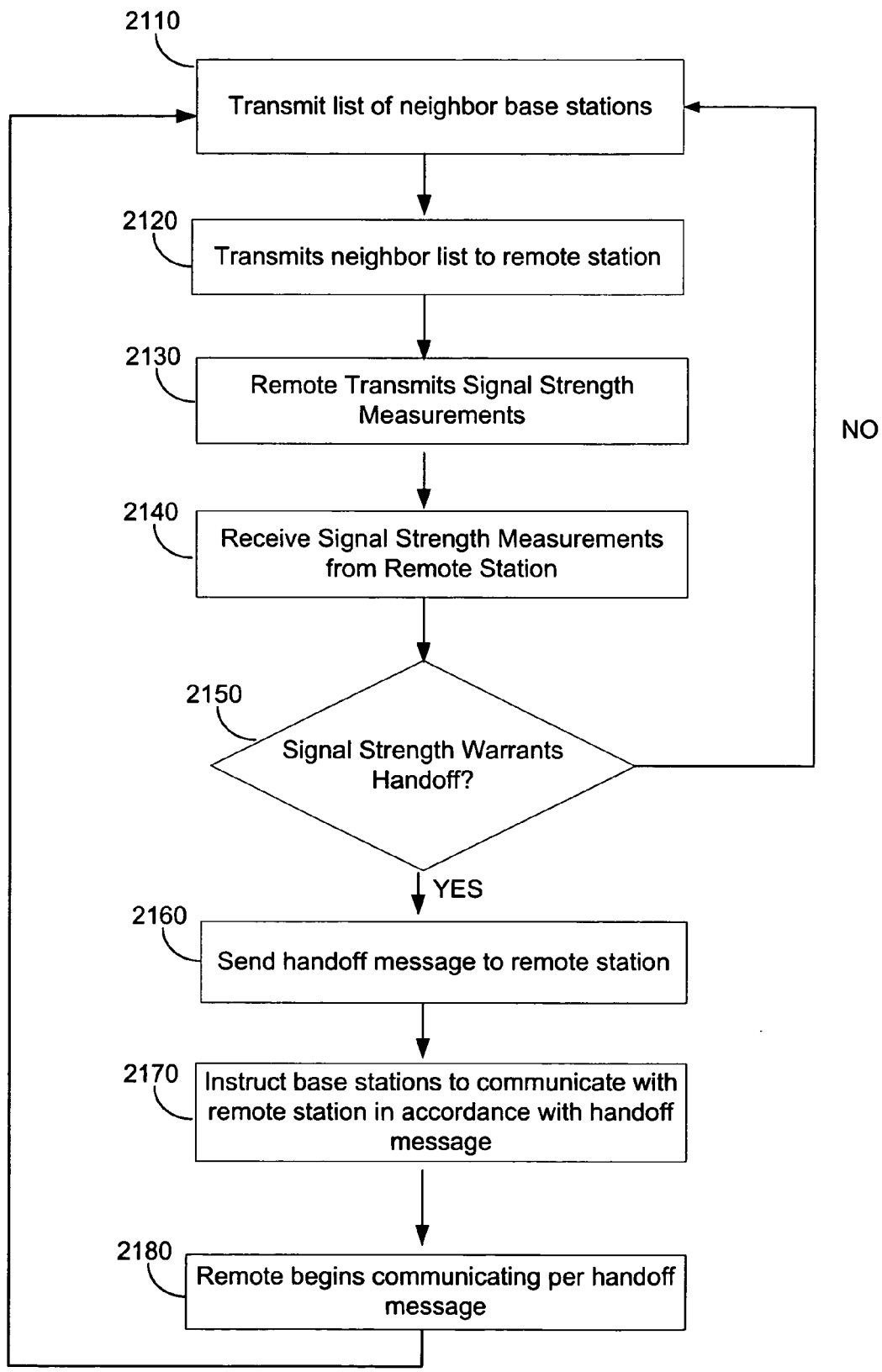
FIG. 21 is a flowchart of the methodology that can be used to implement the first through the eighth handoff embodiments.

FIG. 21 is a flowchart of the methodology that can be used to implement each of the handoff embodiments described above for a non-homogenous network. In block 2110, each base station generates a list of neighboring base stations using methods known to one skilled in the art. The process then proceeds to block 2120.

In block 2120, each base station transmits a neighbor list message containing the list of neighboring base stations. The neighbor list message will indicate the pilot offsets of each of the neighboring base stations, and will either explicitly or implicitly indicate the frequency at which each neighboring pilot signal is transmitted. Additionally, the neighbor list may state additional information about each neighboring base station, such as whether it is a single carrier base station or a multi-carrier base station, or the frequency bands it uses for communication. Alternatively this additional information can be transmitted on another channel, such as a paging channel. The process then proceeds to block 2130.

In block 2130, the remote station receives the neighbor list message and monitors for pilots at frequencies and pilot offsets indicated by the neighbor list message. The remote station gathers signal strength measurements of the pilots it is attempting to detect, and places this information into a signal strength measurement message, which it then transmits. In one embodiment the remote station only transmits information in the signal strength measurement message for signals that are received above a pre-determined threshold (such as pre-determined Ec/Io threshold, as would be known to one skilled in the art). A method and apparatus for generating a signal strength measurement message containing pilot strength information is disclosed in U.S. patent application Ser. No. 09/502,279, filed on Feb. 10, 2000, and entitled "METHOD AND APPARATUS FOR GENERATING PILOT STRENGTH MEASUREMENT MESSAGES", assigned to the assignee of the present invention and incorporated in its entirety herein by reference. Other methods for generating signal strength measurement messages containing pilot strength information are known to those skilled in the art. The process then proceeds to block 2140.

In block 2140, the base station(s) receive the signal strength measurement message. These base stations provide the signal strength measurements to the BSC responsible for handoff. The process then proceeds to block 2150.

In block 2150, the BSC examines the current state of communications with the remote station along with the signal strength measurements received from the remote station, and uses these to determine the new Active Set, the set of base stations with which the remote station should communicate, and whether or not to initiate a handoff in accordance with one of the above-described embodiments. For example, if the current state of the remote station is such that it is only in communications with narrowband base stations, but the received signal strength measurements indicate that the remote station is receiving strong pilot signal measurements both from single carrier base stations and from a multi-carrier base station, then the BSC would initiate a handoff of the above-described embodiments.

If the new active set contains only single carrier base stations, and the remote station is only in communication with single carrier base stations at the present time and those communications utilize the single carrier protocol, then although a handoff will be performed, it will be a handoff other than that of the above-described embodiments. Likewise, if the new active set contains only multi-carrier base stations, and the remote station is only in communication with multi-carrier base stations at the present time and those communications utilize the multi-carrier protocol, then although a handoff will be performed, it will be a handoff other than that of the above-described embodiments. In these cases, the process proceeds to block 2110.

In all other cases, a handoff of the above-described embodiments will be performed, and the process proceeds to block 2160. In block 2160, the BSC instructs at least one base station to transmit to the remote station a handoff message containing instructions for the remote station to perform a handoff. In one embodiment, all base stations that the remote station is currently communicating with transmit the remote station a handoff message containing instructions for the remote station to perform a handoff to the new active set). Depending on the radio propagation environment of the remote station, and depending on which particular handoff embodiment of the above-described embodiments a carrier wishes to use, the handoff message will contain the appropriate subset of handoff instructions as described in reference to the particular handoff embodiment chosen (i.e., a given carrier can choose whether to use any one of the first through the eighth handoff embodiments). Radio propagation environment is mentioned, because as mentioned in the descriptions of the various handoff embodiments, the handoff performed is dependent upon the location of a remote station in relation to the radio signals that it is able to receive from a set of remote stations at any given time.

For instance, if a carrier wanted to support the eighth handoff embodiment, the handoff message transmitted in block 2160 would be based upon the location of the remote station in accordance with the description of the eighth handoff embodiment. Below are examples showing how the location affects the message transmitted in the eighth handoff embodiment.

EXAMPLE 1 remote station at point 520 (going from single carrier coverage into mixed coverage). If a remote station at point 520 transmitted a signal strength measurement message in accordance with block 2130, then, in accordance with the description of the eighth embodiment, a handoff message would be transmitted at block 2160 that instructs the remote station to begin transmitting data in accordance with a single carrier protocol in frequency band Nra (described in reference to the fourth handoff embodiment), and to begin receiving data in accordance with a multi-carrier protocol in frequency band Wf from at least one multi-carrier base station BS3. The handoff message also instructs the remote station to begin receiving data in accordance with a multi-carrier protocol in a single carrier frequency band Nf from at least one single carrier base station BS1.

EXAMPLE 2 remote station at point 530 (going from mixed coverage into multi-carrier coverage). If a remote station at point 530 transmitted a signal strength measurement message in accordance with block 2130, then, in accordance with the description of the eighth embodiment, a handoff message would be transmitted at block 2160 that instructs the remote station to stop single carrier communications with a set of at least one multi-carrier base stations BS3 and to begin multi-carrier communications on the same set of base stations in frequency bands Wf and Wr.

EXAMPLE 3 the remote station at point 540 (going from multi-carrier coverage into mixed coverage). If a remote station at point 540 transmitted a signal strength measurement message in accordance with block 2130, then, in accordance with the description of the eighth embodiment, a handoff message would be transmitted at block 2160 that instructs the remote station to begin transmitting data in accordance with a single carrier protocol in frequency band Nra (described in reference to the fourth handoff embodiment), and to begin receiving data in accordance with a multi-carrier protocol in frequency band Wf from at least one multi-carrier base station BS3. The handoff message also instructs the remote station to begin receiving data in accordance with a multi-carrier protocol in Nf from at least one single carrier base station BS1.

EXAMPLE 4 the remote station at point near point 550 (going from mixed coverage into single carrier coverage). If a remote station at point 550 transmitted a signal strength measurement message in accordance with block 2130, then, in accordance with the description of the eighth embodiment, a handoff message would be transmitted at block 2160 that instructs the remote station to cease all communications using multi-carrier protocols, and to only communicate with a set of at least one single carrier base stations BS1 using single carrier communications in frequency bands Nf and Nr.

Although these specific examples are related to the eighth handoff embodiment, after reading the description of all eight handoff embodiments described above one skilled in the art will recognize what handoff messages will need to be transmitted in block 2160 based upon the handoff embodiment chosen and the signal strength measurements received from the remote station (these measurements allow the base station controller to estimate the location of the remote station). The process then proceeds to block 2170.

In block 2170, in accordance with the location of the remote station and in accordance with the particular handoff embodiment chosen, the base station controller instructs the base stations to perform accordingly. These instructions will be consistent with the handoff message transmitted in block 2160. If in accordance with the particular handoff embodiment one or more base stations should cease or alter their communications with the remote station, they are instructed to do so. Likewise, if in accordance with the particular handoff embodiment one or more base stations should begin communications with the remote station, they are instructed to do so in accordance with the handoff message of block 2160.

As an example, if a carrier wanted to support the eighth handoff embodiment, and the remote station was at point 520, and thus the handoff message described in reference to Example 1 of block 2160 was transmitted, then in block 2170 the base station controller would instruct at least one multi-carrier base station BS3 to setup a forward link to the remote station for data transmissions in accordance with a multi-carrier protocol, and to setup a reverse link to the remote station for receiving data transmissions in accordance with a single carrier protocol in a frequency band Nra (as described in reference to the fourth handoff embodiment). Additionally, the base station controller instructs at least one single carrier base station BS1 that was communicating in single carrier mode with the remote station prior to the handoff to stop receiving data from the remote station, and to alter the mode of transmission to the remote station to a mode in which it transmits in a single carrier frequency band Nf a portion of a signal generated in accordance with a multi-carrier protocol.

Although this specific example is related to the eighth handoff embodiment in a scenario wherein the remote station moved from single carrier coverage to mixed coverage, after reading the description of all eight handoff embodiments described above one skilled in the art will recognize what instructions the base station controller will give to the base stations in block 2170 based upon the handoff embodiment chosen and the estimated location of the remote station (as can be determined by the signal strength measurements using procedures known to one skilled in the art). The process then proceeds to block 2180.

In block 2180, the remote station receives the handoff message transmitted in block 2160, and complies with the instructions. If the received handoff message either explicitly or implicitly instructs the remote station to cease receiving communications from one or more base stations, the remote station will stop receiving data communications from those base stations. Also, if the remote station is instructed to begin listening to transmissions from one or more base stations, it will do so.

If the handoff message instructs the remote station to switch its mode of reception from a single carrier mode to a multi-carrier mode, it will do so. Conversely, if the handoff message instructs the remote station to switch its mode of reception from a multi-carrier mode to a single carrier mode, it will do so.

If the handoff message instructs the remote station to switch its mode of transmission from a single carrier mode to a multi-carrier mode it will do so. Conversely, if the handoff message instructs the remote station to switch its mode of transmission from a multi-carrier mode to a single carrier mode it will do so. Additionally, if the handoff message instructs the remote station to transmit in data in a single carrier mode in a particular single carrier frequency band (e.g., Nr versus Nra in the first through eighth embodiments), the remote station will begin transmitting data in a single carrier mode in that particular single carrier frequency band.

As an example, if a carrier wanted to support the eighth handoff embodiment, and the remote station was at point 520, and thus the handoff message described in reference to Example 1 of block 2160 was transmitted, then in block 2180 the remote station would begin transmitting data on the reverse link in accordance with a single carrier protocol in a frequency band Nra (as described in reference to the fourth handoff embodiment), and it would change its forward link mode of reception to one in which it receives data in accordance with a multi-carrier protocol. In addition to receiving a multi-carrier transmission from at least one multi-carrier base station BS3, the remote station would begin receiving a portion of a signal generated in accordance with the multi-carrier protocol that was transmitted over at least one single carrier base station BS1. In one embodiment the remote station is instructed to only decode the portion of the signal that occurs in the single carrier frequency band because the single carrier base stations BS1 will only be transmitting a portion of the multi-carrier signal. In an alternative embodiment, the remote station is simply instructed to decode the entire multi-carrier signal from the single carrier base stations BS1. In such an embodiment, although the remote station will not be able to decode the entire expected multi-carrier signal from BS1, but rather only the portion that was transmitted by BS1, the absence of some of the signal will not negatively impact the remote station when decoding the entire multi-carrier signal as received from BS3.

Although this specific example is related to the eighth handoff embodiment in a scenario wherein the remote station moved from single carrier coverage to mixed coverage, after reading the description of all eight handoff embodiments described above one skilled in the art will recognize what instructions the base station controller will put into the handoff message in block 2160, based upon the handoff embodiment chosen and the estimated location of the remote station (as can be determined by the signal strength measurements using procedures known to one skilled in the art), and therefore will be able to determine what the remote station does in block 2180 in response to the reception of the handoff message. The process then proceeds to block 2110.

Figure 22:
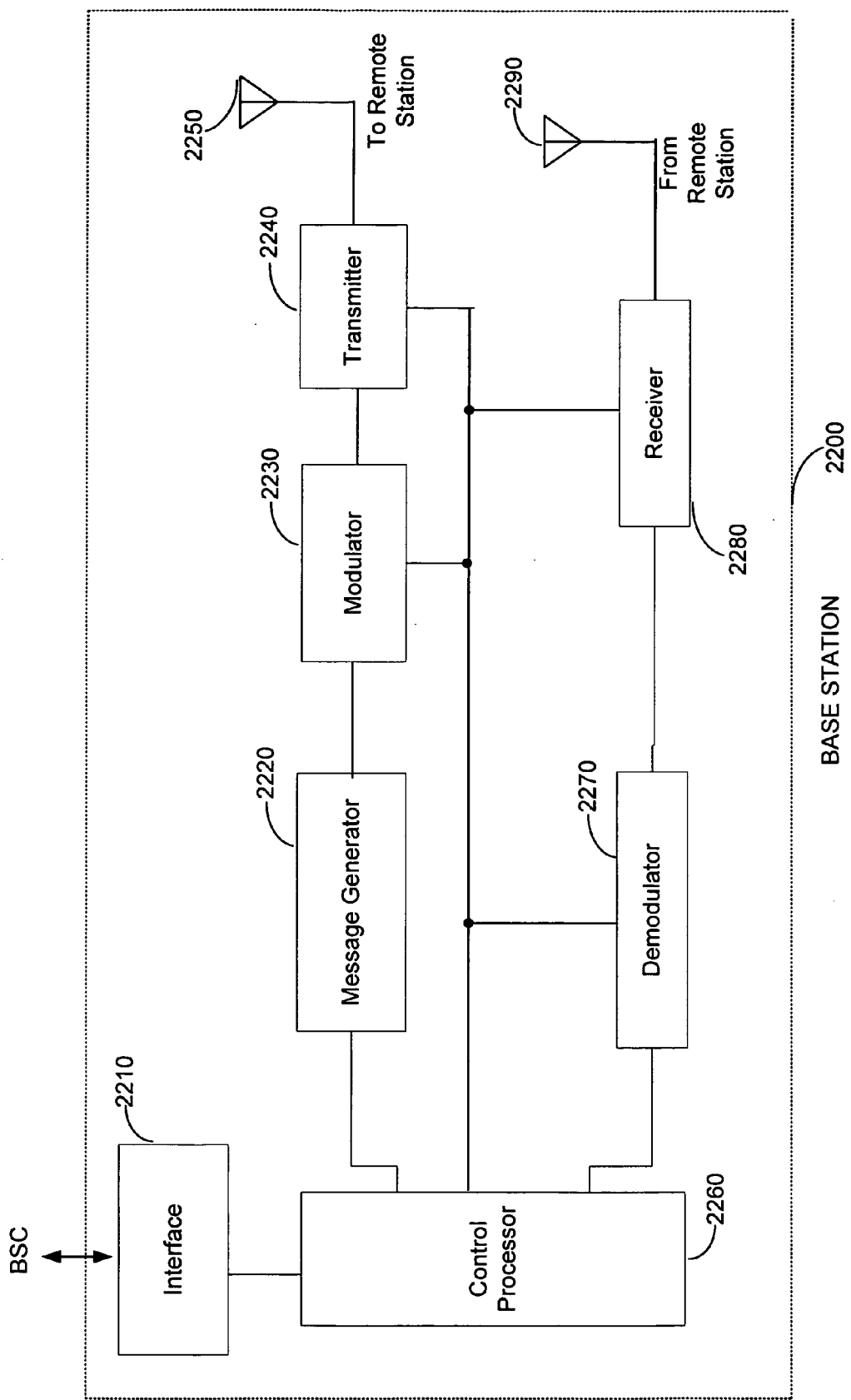
FIG. 22 is an exemplary block diagram of a base station apparatus that can be used to perform the first through the eight handoff embodiments.

In FIG. 22, base station 2200 generates a neighbor list message in message generator 2220 and provides the message to modulator 2230. The message is modulated by modulator 2230 and provided to transmitter 2240, which upconverts and amplifies the signal and transmits the resulting signal through antenna 2250.

In one embodiment, modulator 2230 is a multi-mode modulator, capable of performing modulation in compliance with a single carrier protocol and also capable of performing modulation in compliance with a multi-carrier protocol. In one such embodiment, modulator 2230 performs single carrier modulation in compliance with the 1X protocol and performs multi-carrier modulation in compliance with the 3X protocol. In an embodiment in which modulator 2230 is a multi-mode modulator, prior to performing modulation control processor 2260 instructs modulator 2230 as to whether it should modulate messages in accordance with a single carrier protocol or a multi-carrier protocol, as described in accordance with handoff embodiments 1 through 8. In one embodiment modulator 2230 is physically comprised of two separate modulators, one of which performs single carrier modulation, and another of which performs multi-carrier modulation. Control Processor 2260 either contains internal memory, or it is able to set and retrieve the value of memory in an external memory unit (not shown), as is commonly known in the art.

In one embodiment, transmitter 2240 is a multi-mode transmitter, capable of transmitting in a multi-carrier frequency band, and also capable of transmitting in a single carrier frequency band (such as 1.25 MHz for 1X). In an embodiment in which transmitter 2240 is a multi-mode transmitter, prior to performing transmissions, control processor 2260 instructs transmitter 2240 as to whether it should transmit messages in a single carrier frequency band or in a multi-carrier frequency band.

One skilled in the art will recognize that control processor 2260 may be implemented using field-programmable gate arrays (FPGA), programmable logic devices PLD), digital signal processors (DSP), one or more microprocessors, application specific integrated circuit (ASIC) or other device capable of performing the functions described above.

Figure 23:
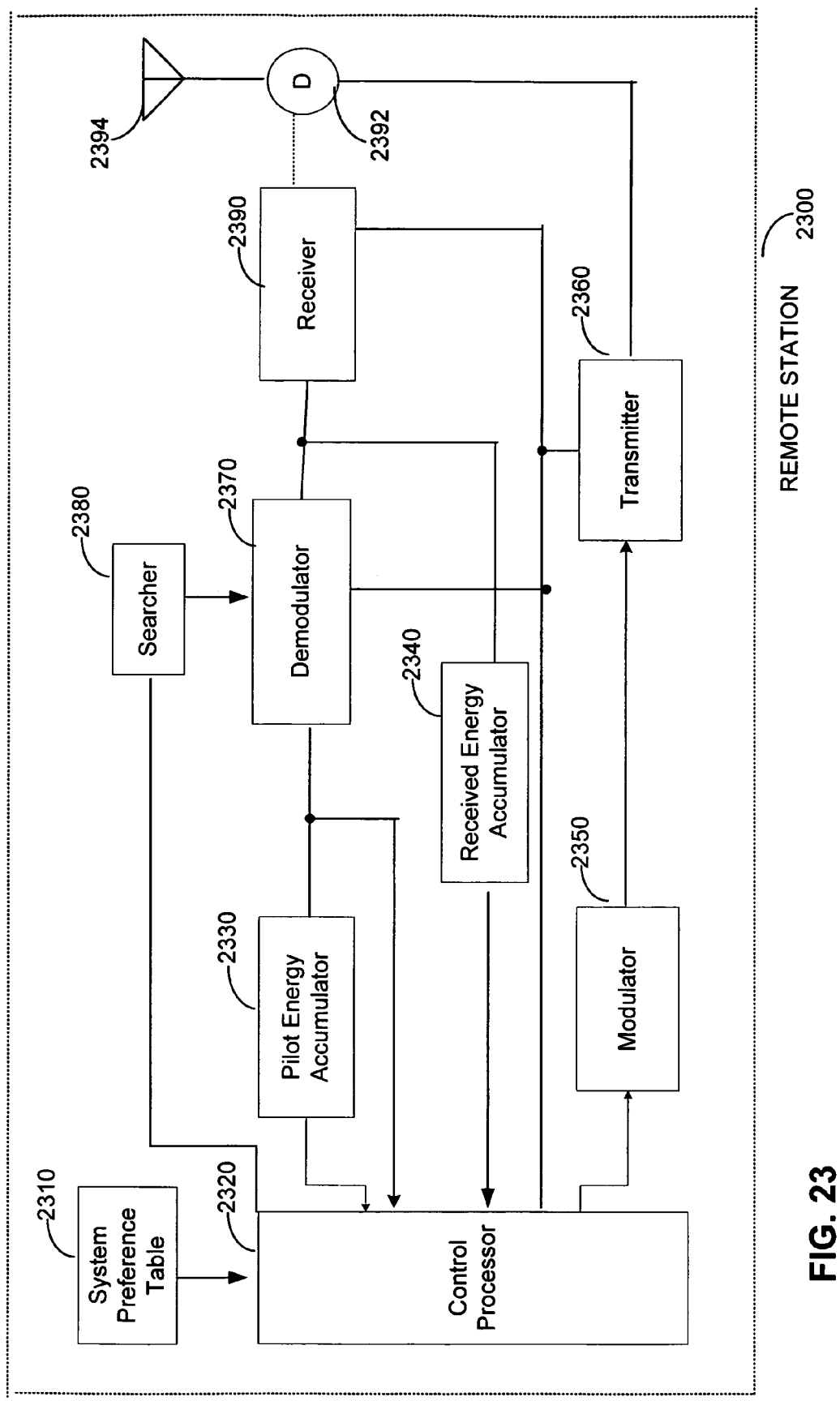
FIG. 23. is an exemplary block diagram of a remote station apparatus that can be used to perform the first through the eight handoff embodiments.

Referring to FIG. 23, the transmitted signal is received by remote station 2300 by antenna 2394, after which it passes through duplexer 2392 to receiver 2390, which downconverts, filters and amplifies the signal. Receiver 2390 is a multi-mode receiver capable of receiving data in a single carrier frequency band, and also capable of receiving data in a multi-carrier frequency band. Control processor 2320 instructs receiver 2390 whether to be in single carrier or multi-carrier receipt mode any given moment, in accordance with handoff embodiments 1–8. Control Processor 2320 either contains internal memory, or it is able to set and retrieve the value of memory in an external memory unit (not shown), as is commonly known in the art.

The received signal is then demodulated by demodulator 2370 and provided to control processor 2320. Demodulator 2370 is a multi-mode demodulator, capable of performing demodulation in compliance with a single carrier protocol and also capable of performing demodulation in compliance with a multi-carrier protocol. In one such embodiment, demodulator 2370 performs single carrier demodulation in compliance with the 1X protocol and performs multi-carrier demodulation in compliance with the 3X protocol. Prior to performing demodulation, control processor 2320 instructs demodulator 2370 as to whether it should modulate messages in accordance with single carrier protocol 1X or multi-carrier protocol 3X, as described in accordance with handoff embodiments 1 through 8.

Demodulator 2370 provides the neighbor list message to Control processor 2320, which then generates a set of commands directing a search to be performed by searcher 2380. Searcher 2380 provides a set of search demodulation parameters to demodulator 2370. The demodulated signals are provided to pilot energy accumulator 2330, which measures the strength of the pilots of the base stations of the neighbor list. The energy of each of these neighbors is provided to control processor 2320, which compares the measured energy with a predetermined threshold T_ADD. Control processor 2320 generates a message that signifies which, if any, of the neighboring base station's signals exceeded the threshold T_ADD. Hereinafter, the term Active Set is used to identify these neighboring base stations.

The message is provided to modulator 2350, where it is modulated. The modulated signal is then provided to transmitter 2360, where it is upconverted and amplified, after which it travels through duplexer 2392 to antenna 2394, where it is transmitted.

Modulator 2350 is a multi-mode modulator, capable of performing modulation in compliance with a single carrier protocol and also capable of performing modulation in compliance with a multi-carrier protocol. In one such embodiment, modulator 2350 performs single carrier modulation in compliance with the 1X protocol and performs multi-carrier modulation in compliance with the 3X protocol. In an embodiment in which modulator 2350 is a multi-mode modulator, prior to performing modulation control processor 2320 instructs modulator 2350 as to whether it should modulate messages in accordance with a single carrier protocol or a multi-carrier protocol, as described in accordance with handoff embodiments 1 through 8. In one embodiment, transmitter 2360 is a multi-mode transmitter, capable of performing transmissions in a single carrier frequency band (such as 1.25 MHz for 1X) and in a multi-carrier frequency band (such as three 1.25 MHz chunks for 3X). In such an embodiment, control processor 2320 instructs transmitter 2360 whether to transmit in a single carrier frequency band or in a multi-carrier frequency band. In an embodiment that can be used to support the 4th and 7th handoff embodiments, wherein the remote station can transmits in one of two single carrier frequencies (e.g. Nr or Nra) depending upon the coverage areas that it is in, control processor 2320 instructs transmitter 2360 as to which frequency band to transmit in.

Referring back to FIG. 22, the message indicating the strengths of the neighboring base stations is received by antenna 2290 of base station 2200. The signal is downconverted and amplified by receiver 2280 and provided to demodulator 2270. Demodulator 2270 demodulates the signal and provides the result to control processor 2260. Control processor 2260 generates an Active Set list for the BSC in accordance with the information in the message transmitted by remote station 2300 indicating the results of its search. In the exemplary embodiment, the Active Set list will consist of all base stations whose signals, when monitored by remote station 2300, exceeded the energy threshold T_ADD.

In one embodiment, receiver 2280 can receive data both in a multi-carrier frequency band and in a single carrier frequency band. In such an embodiment, control processor 2260 instructs receiver 2280 whether to receive in a multi-carrier frequency band or in a single carrier frequency band. In an embodiment that can be used to support the 4th and 7th handoff embodiments, wherein the base station anticipates the remote station can transmitting in one of two single carrier frequencies (e.g. Nr or Nra), control processor 2260 instructs receiver 2280 as to which frequency band to receive in.

Control Processor 2260 sends the Active Set list to interface 2210, which forwards a message indicating the Active Set list to the BSC. Interface 2210 can be any interface that allows for communication between the base station and the BSC. In a centralized system, such interfaces are known in the art and include, but are not limited to, ethernet interfaces, T1 interfaces, E1 interfaces, ATM interfaces, and microwave interfaces. In a decentralized system, interface 2210 could simply be a memory bus or an area of shared memory. Capacity issues allowing, the BSC provides forward link channels on a subset of base stations in the Active Set list. The forward link channels are setup on each base station 2200 in accordance with the Active Set list, and in accordance with the handoff embodiment being used. Additionally, reverse link channels are setup on each base 2200 in accordance with the Active Set list, and in accordance with the handoff embodiment being used. As per the above-described handoff embodiments, it is possible that forward link channels can be setup on certain base stations without setting up reverse link channels on those base stations (e.g. the eighth handoff embodiment). Also, as per the above-described handoff embodiments, it is possible that reverse link channels can be setup on certain base stations without setting up forward link channels on those base stations (e.g., the third and fourth handoff embodiments).

In one embodiment, control Processor 2260 also provides the Active Set list to message generator 2220. The resulting handoff message is modulated by modulator 2230 and transmitted as described above. In one embodiment, the handoff message explicitly states which frequencies the remote station should begin receiving and transmitting on and whether the data should be modulated in a single carrier format (e.g. 1X) or multi-carrier format (e.g., 3X). Such a handoff message is generated in accordance with the handoff embodiment being used. In one embodiment, the handoff message merely states which base stations the remote station is to communicate with, and the remote station is implicitly able to tell which frequencies to communicate with from the receipt of other messages detailing the capabilities of each base station.

Figure 24:
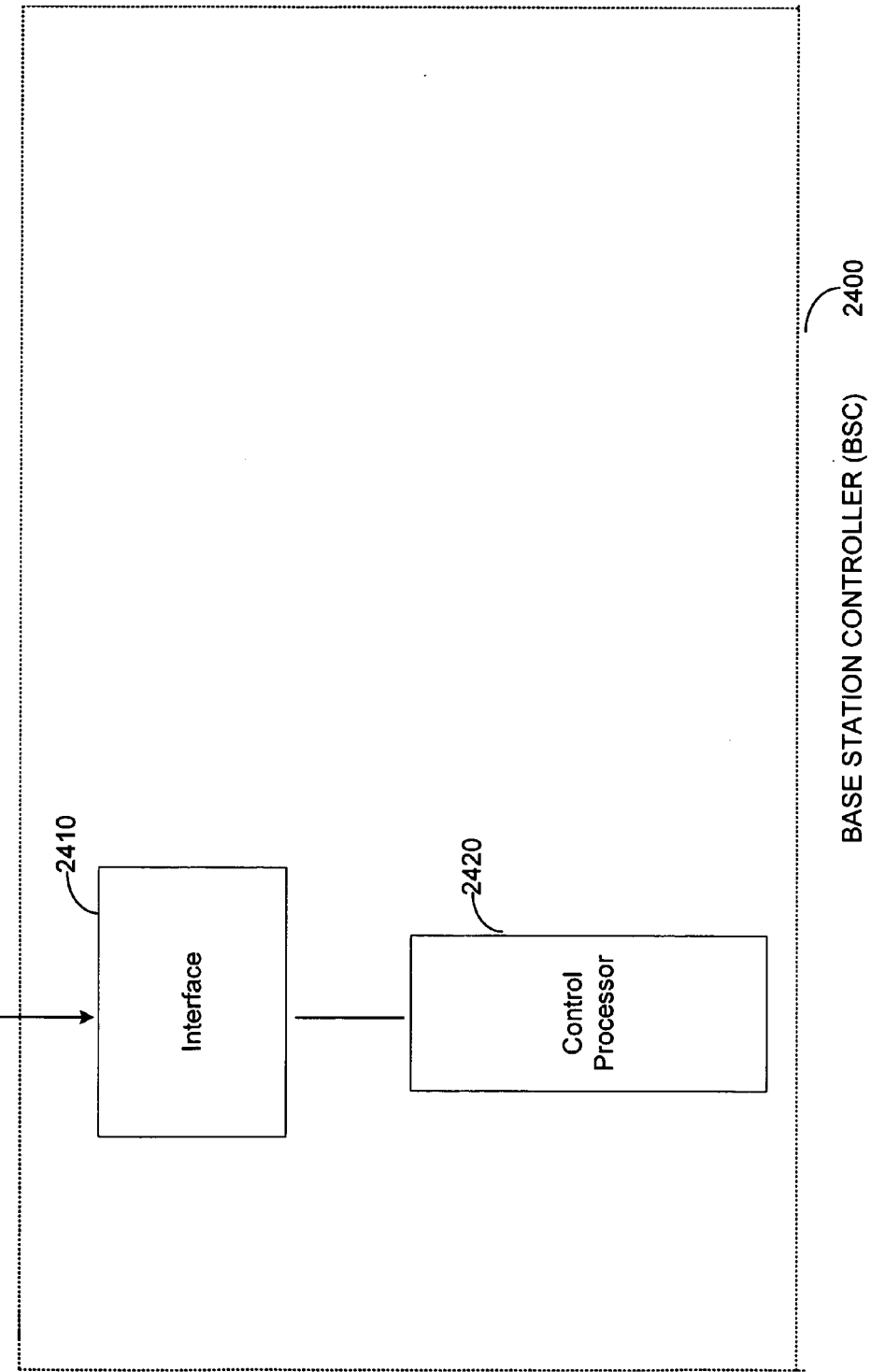
FIG. 24. is an exemplary block diagram of a base station controller (BSC) apparatus that can be used to perform the first through the eight handoff embodiments.

In an alternative embodiment, a control processor 2420 of BSC 2400, diagrammed in FIG. 24, generates the handoff message in accordance with the Active Set list and in accordance with the handoff embodiment being used. In such an embodiment, control processor 2420 sends the generated handoff message to each base station 2200 with which the remote station is currently communicating. Control processor 2420 sends the handoff message to base stations 2200 via BSC interface 2410. In such an embodiment, each control processor 2260 receives the handoff message generated by the BSC via interface 2210. In such an embodiment, control Processor 2260 of base station 2200 provides the handoff message to modulator 2230, which modulates the handoff message and transmits it as described above.

Interface 2410 can be any interface that allows for communication between the base station and the BSC. In a centralized system, such interfaces are known in the art and include, but are not limited to, ethernet interfaces, T1 interfaces, E1 interfaces, ATM interfaces, and microwave interfaces. In a decentralized system, interface 2410 could simply be a memory bus or an area of shared memory. Control Processor 2420 either contains internal memory, or it is able to set and retrieve the value of memory in an external memory unit (not shown), as is commonly known in the art. One skilled in the art will recognize that control processor 2420 may be implemented using field-programmable gate arrays (FPGA), programmable logic devices PLD), digital signal processors (DSP), one or more microprocessors, application specific integrated circuit (ASIC) or other device capable of performing the functions described above.

Remote station 2300 receives the message by antenna 2394, demodulates the signal as described above, and provides the message to control processor 2320. Control processor 2320 then provides information regarding the Active Set list to demodulator 2370 and receiver 2390, and a handoff is attempted using the parameters of the base stations in the Active Set list. It should be noted that because, in this example, the Active Set is based upon previous information generated by remote station 2300, the remote station 2300 need not receive the Active Set list, because it often knows the stations on the list a priori. Thus, in an alternative embodiment, the remote station may delay a predetermined time period and perform handoff to the base stations whose signal exceeded the threshold. If, on the other hand, the active set is not simply a copy of the base stations which exceeded the threshold, but rather also takes into account parameters unknown to the remote station, such as capacity parameters of other base stations, then transmission of the message would prove of value.

One skilled in the art will recognize that control processor 2320 may be implemented using field-programmable gate arrays (FPGA), programmable logic devices PLD), digital signal processors (DSP), one or more microprocessors, application specific integrated circuit (ASIC) or other device capable of performing the functions described above.

The previous description of the embodiments is provided to enable a person skilled in the art to make or use the present invention. The various modifications to these embodiments will be readily apparent to those skilled in the art, and the generic principles defined herein may be applied to other embodiments without the use of the inventive faculty. Additionally, the various methods taught herein can be combined with each other in any manner without the use of the inventive faculty. Thus, the present invention is not intended to be limited to the embodiments shown herein but is to be accorded the widest scope consistent with the principles and novel features disclosed.

What is claimed is:

1. A method of facilitating a remote station hand-off, comprising:
   receiving signals in a first frequency band in accordance with a single carrier protocol at said remote station;
   transmitting signal strength measurements of various base stations in a first message from said remote station; and
   receiving a second message at said remote station that indicates that said remote station should begin receiving signals in accordance with a multi-carrier protocol in a second frequency band that is larger than said first frequency band, wherein the second message is responsive to a determination that at least one of various base stations is single-carrier compliant and at least one of various base stations is multi-carrier compliant.

2. The method of claim 1 wherein said first frequency band is contained within said second frequency band.

3. The method of claim 1, wherein said second message also indicates that said remote station should begin transmitting messages in accordance with said multi-carrier protocol on a second frequency band that is larger than said first frequency band.

4. The method of claim 1, further comprising the steps of:
   receiving at said remote station from said at least one of various base stations that is multi-carrier compliant, signals in accordance with said single carrier protocol in said first frequency band; and
   monitoring, from said at least one of said various base stations that is multi-carrier compliant, a second frequency band for signals transmitted in accordance with said single carrier protocol in said second frequency band.

5. A remote station, comprising:
   means for receiving signals in a first frequency band in accordance with a single carrier protocol;
   means for transmitting signal strength measurements of various base stations in a first message; and
   means for receiving a second message that indicates that said remote station should begin receiving signals in accordance with a multi-carrier protocol in a second frequency band that is larger than said first frequency band, wherein the second message is responsive to a determination that at least one of various base stations is single-carrier compliant and at least one of various base stations is multi-carrier compliant.

6. The remote station of claim 5, wherein said first frequency band is contained within said second frequency band.

7. The remote station of claim 5 wherein said second message also indicates that said remote station should begin transmitting messages in accordance with said multi-carrier protocol on a second frequency band that is larger than said first frequency-band.

8. The remote station of claim 5 further comprising:
means for receiving at said remote station from said at least one of various base stations that is multi-carrier compliant, signals in accordance with said single carrier protocol in said first frequency band; and
means for monitoring, from said at least one of said various base stations that is multi-carrier compliant, a second frequency band for signals transmitted in accordance with said single carrier protocol in said second frequency band.

9. A computer readable media embodying a method comprising of facilitating a remote station hand-off, the method comprising:
receiving signals in a first frequency band in accordance with a single carrier protocol at said remote station;
transmitting signal strength measurements of various base stations in a first message from said remote station; and
receiving a second message at said remote station that indicates that said remote station should begin receiving signals in accordance with a multi-carrier protocol in a second frequency band that is larger than said first frequency band, wherein the second message is responsive to a determination that at least one of various base stations is single-carrier compliant and at least one of various base stations is multi-carrier compliant.

10. A computer readable media embodying a method comprising of facilitating a remote station hand-off, the method comprising:
receiving signals in a first frequency band in accordance with a single carrier protocol at said remote station;
transmitting signal strength measurements of various base stations in a first message from said remote station; and
receiving a second message at said remote station that indicates that said remote station should begin receiving messages in accordance with a multi-carrier protocol in a second frequency band that is larger than said first frequency band, and wherein said second message also indicates that said remote station should begin transmitting messages in accordance with said multi-carrier protocol on a second frequency band that is larger than said first frequency band, and further, wherein the second message is responsive to a determination that at least one of various base stations is single-carrier compliant and at least one of various base stations is multi-carrier compliant.

11. A computer readable media of claim 10, wherein the method embodied further comprises:
receiving at said remote station from said at least one of various base stations that is multi-carrier compliant, signals in accordance with said single carrier protocol in said first frequency band; and
monitoring, from said at least one of said various base stations that is multi-carrier compliant, a second frequency band for signals transmitted in accordance with said single carrier protocol in said second frequency band.

* * * * *